US011617016B2

United States Patent
Murtaza et al.

(10) Patent No.: US 11,617,016 B2
(45) Date of Patent: *Mar. 28, 2023

(54) METHOD AND APPARATUS FOR EFFICIENT DELIVERY AND USAGE OF AUDIO MESSAGES FOR HIGH QUALITY OF EXPERIENCE

(71) Applicant: Fraunhofer-Gesellschaft zur Förderung der angewandten Forschung e.V., Munich (DE)

(72) Inventors: Adrian Murtaza, Erlangen (DE); Harald Fuchs, Erlangen (DE); Bernd Czelhan, Erlangen (DE); Jan Plogsties, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/224,782

(22) Filed: Apr. 7, 2021

(65) Prior Publication Data

US 2021/0306683 A1    Sep. 30, 2021

Related U.S. Application Data

(63) Continuation of application No. 16/845,394, filed on Apr. 10, 2020, now Pat. No. 11,006,181, which is a
(Continued)

(30) Foreign Application Priority Data

Oct. 12, 2017   (EP) .................................... 17196255

(51) Int. Cl.
*H04N 21/4728*    (2011.01)
*H04N 19/167*    (2014.01)
(Continued)

(52) U.S. Cl.
CPC ......... *H04N 21/4728* (2013.01); *G06F 3/167* (2013.01); *H04N 19/167* (2014.11);
(Continued)

(58) Field of Classification Search
None
See application file for complete search history.

(56) References Cited

U.S. PATENT DOCUMENTS 9,754,167 B1 *    9/2017   Holz .......................... G06F 3/00
11,006,181 B2 *   5/2021   Murtaza ........... H04N 21/21805
(Continued)

FOREIGN PATENT DOCUMENTS

AU    2012313936 A1    5/2014
CN    105792086 A    7/2016
(Continued)

OTHER PUBLICATIONS

Hossein Najaf-Zadeh et al : "OMAF: Use of Earcons for ROI Identification in 360-degree Video", 119. MPEG Meeting; Jul. 17, 2017-Jul. 21, 2017; Torino; (Motion Picture Expert Group or ISO/IEC JTC1/SC29/WG11), No. M41184, Jul. 16, 2017 (Jul. 16, 2017), XP030069527.
(Continued)

Primary Examiner — Eileen M Adams
(74) Attorney, Agent, or Firm — Novick, Kim & Lee, PLLC; Jae Youn Kim

(57) ABSTRACT

A method and a system for virtual reality, augmented reality, mixed reality, or 360-degree Video environment is disclosed. The system receives Video Streams associated to audio and video scenes to be reproduced and Audio Streams associated to audio and video scenes to be reproduced. There are provided a Video decoder which decodes signal from the Video Stream for the representation of the audio and video scene; an Audio decoder which decodes signal from the
(Continued)

Audio Stream for the representation of the audio and video scene to the user; and a region of interest processor deciding, based e.g. on the user's viewport, head orientation, movement data, or metadata, whether an Audio information message is to be reproduced. At the decision, the reproduction of the Audio information message is caused.

33 Claims, 15 Drawing Sheets

Related U.S. Application Data continuation of application No. PCT/EP2018/077556, filed on Oct. 10, 2018.

(51) Int. Cl.
| | |
|---|---|
| *G06F 3/16* | (2006.01) |
| *H04N 21/218* | (2011.01) |
| *H04N 21/845* | (2011.01) |
| *H04N 21/233* | (2011.01) |
| *H04N 21/2343* | (2011.01) |
| *H04N 21/235* | (2011.01) |
| *H04N 21/2368* | (2011.01) |
| *H04N 21/442* | (2011.01) |

(52) U.S. Cl.
CPC ... *H04N 21/21805* (2013.01); *H04N 21/2335* (2013.01); *H04N 21/2353* (2013.01); *H04N 21/2368* (2013.01); *H04N 21/234309* (2013.01); *H04N 21/234318* (2013.01); *H04N 21/44218* (2013.01); *H04N 21/8456* (2013.01)

(56) References Cited

U.S. PATENT DOCUMENTS

| | | |
|---|---|---|
| 2004/0057514 A1 | 3/2004 | Kishi |
| 2008/0008342 A1* | 1/2008 | Sauk ............... G01C 21/165 |
| | | 381/315 |
| 2010/0299630 A1 | 11/2010 | Exner et al. |
| 2013/0205247 A1 | 8/2013 | Erhard et al. |
| 2013/0259312 A1 | 10/2013 | Lyons et al. |
| 2013/0300653 A1 | 11/2013 | Lewis et al. |
| 2014/0016703 A1 | 1/2014 | Denoual |
| 2014/0133683 A1 | 5/2014 | Robinson et al. |
| 2016/0381398 A1* | 12/2016 | Saxena ............... H04N 21/816 |
| | | 348/39 |
| 2018/0140918 A1* | 5/2018 | Bilbrey ............... G06F 3/167 |

FOREIGN PATENT DOCUMENTS

| | | |
|---|---|---|
| EP | 3037915 A1 | 6/2016 |
| EP | 3037915 B1 | 8/2017 |
| JP | 2005086434 A | 3/2005 |
| WO | 2013049248 A2 | 4/2013 |
| WO | 2017112520 A1 | 6/2017 |

OTHER PUBLICATIONS

Hobart; (Motion Picture Expert Group or ISO/IEC JTC1/SC29/WG11), "Descriptions of Comparison Experiments for Omnidirectional MediA Format", 118. MPEG Meeting ; Apr. 3, 2017- Apr. 7, 2017; No. NI6829, May 9, 2017 (May 9, 2017), XP030023495, p. 8-p. 10.
ISO/IEC 23008-3:2015, Information technology—High efficiency coding and media delivery in heterogeneous environments—Part 3: 3D audio.
Choi et al., Study of ISO/IEC DIS 23000-20 JTC1/SC29/WG11, N16950, Omnidirectional Media Format, Jul. 2017, Torino, Italy.
Buldagavi Madhukar et. al., "360 Degrees Video Coding Using Region Adaptive Smoothing " DOI: '10.1109/ICIP.2015.7350899.
Rajeev Kumar, "Office Action for IN Application No. 202037015857", dated Sep. 10, 2021, Intellectual Property India, India.
B. Van Coile et al., "Speech Synthesis for the New Pan-European Traffic Message Control System RDS-TMC", 4th European Conference on Speech Communication and Technology. Eurospeech '95. Madrid, Spain, Sep. 18-21, 1995; Graficas Brens, ES, vol. 1, pp. 145-148, XP000854676.
Jean Schneiderlin, "Extended European Search Report for EP Application No. 21191482.5", dated Jan. 7, 2022, EPO, Germany.
Rajeev Kumar, "Office Action for IN Application No. 202238018745", dated Aug. 19, 2022, Intellectual Property India, India.
Rajeev Kumar, "Office Action for IN Application No. 202238018744", dated Aug. 16, 2022, Intellectual Property India, India.
Yang Zhang et al., Situation and development of 3D audio technology in virtual reality, Audio Engineering, vol. 41, No. 6, 2017, Jun. 17, 2017 pp. 60-66.

\* cited by examiner

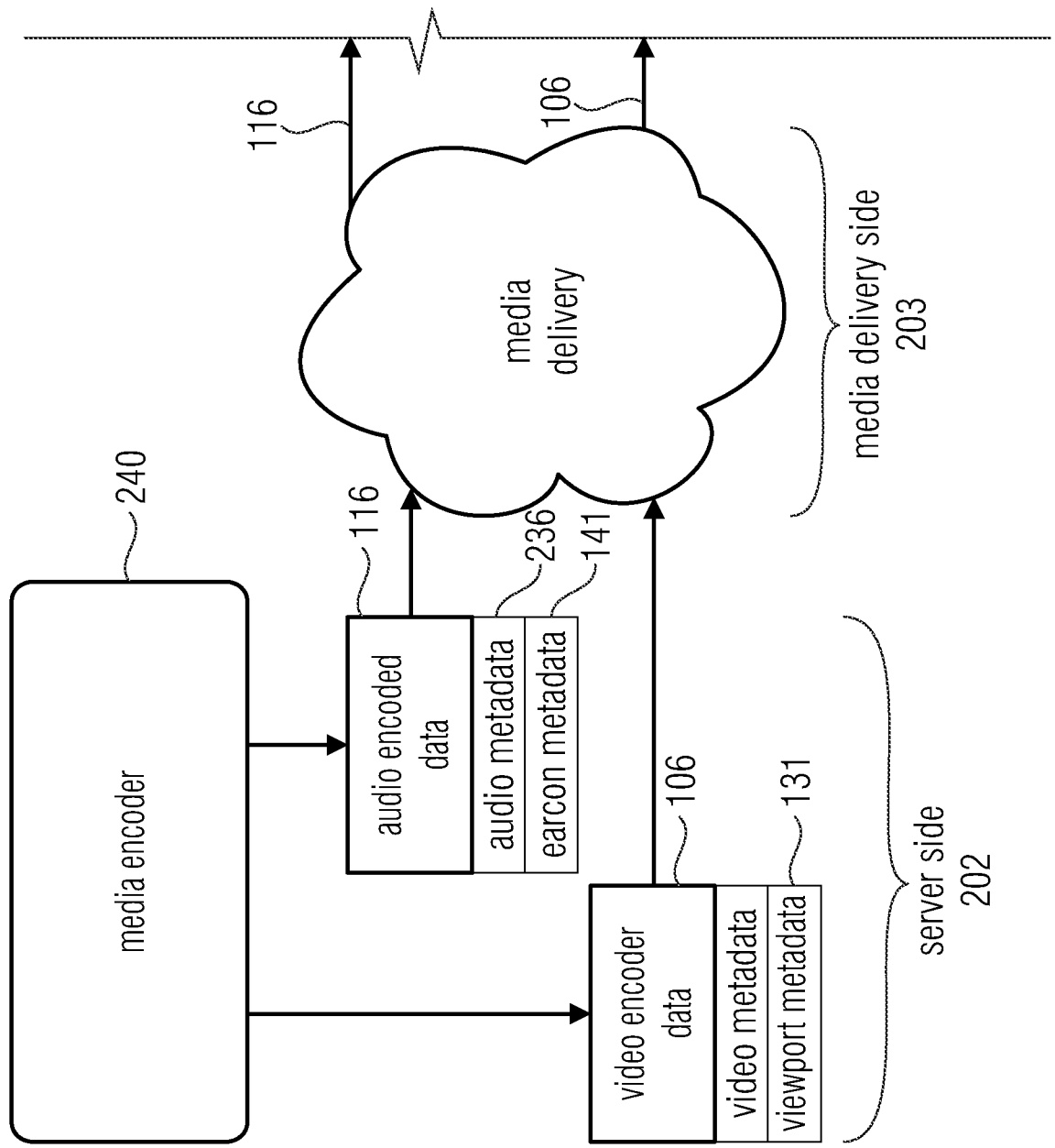
Fig. 2 (Part 1)

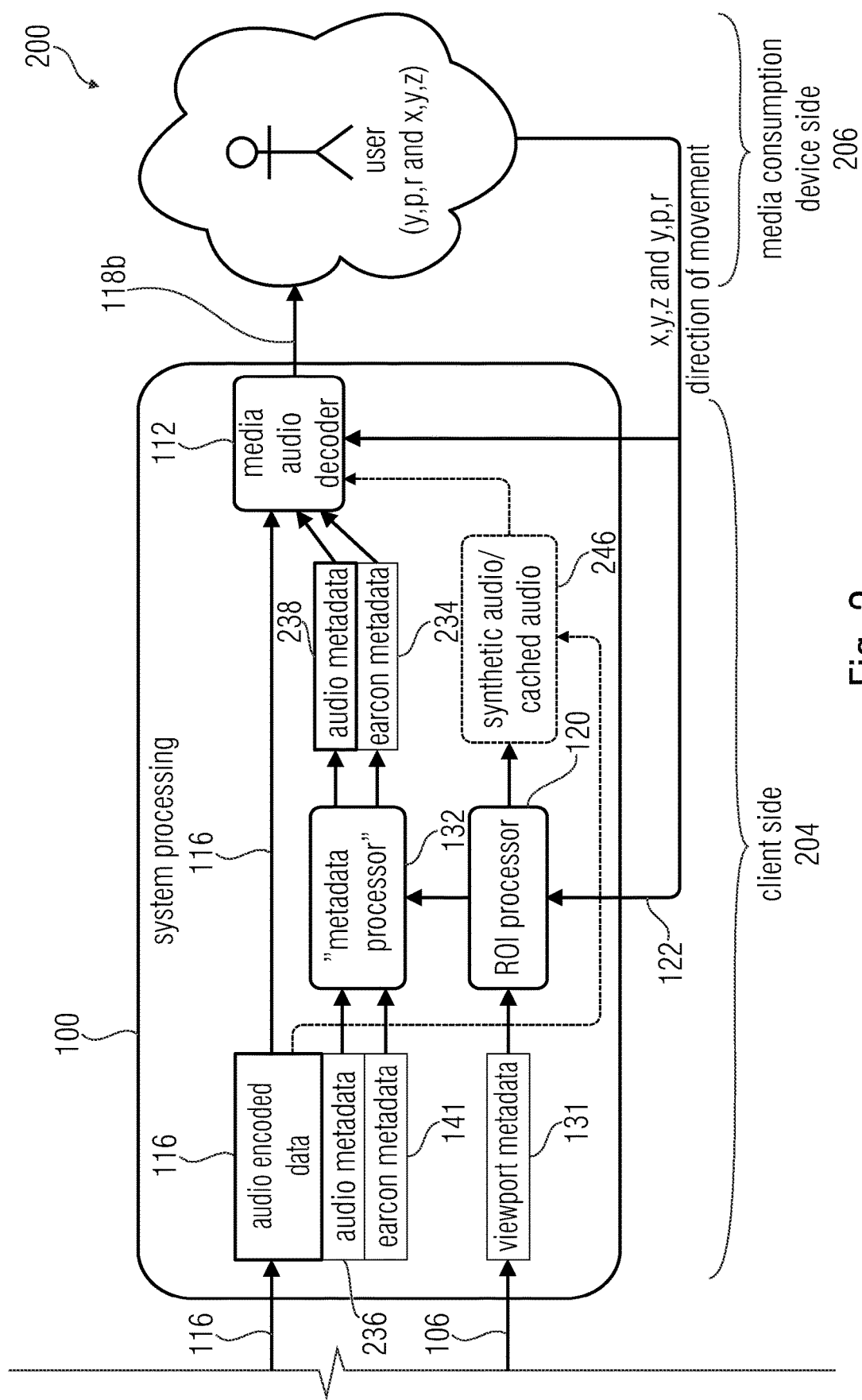
Fig. 2 (Part 2)

(Part 1)

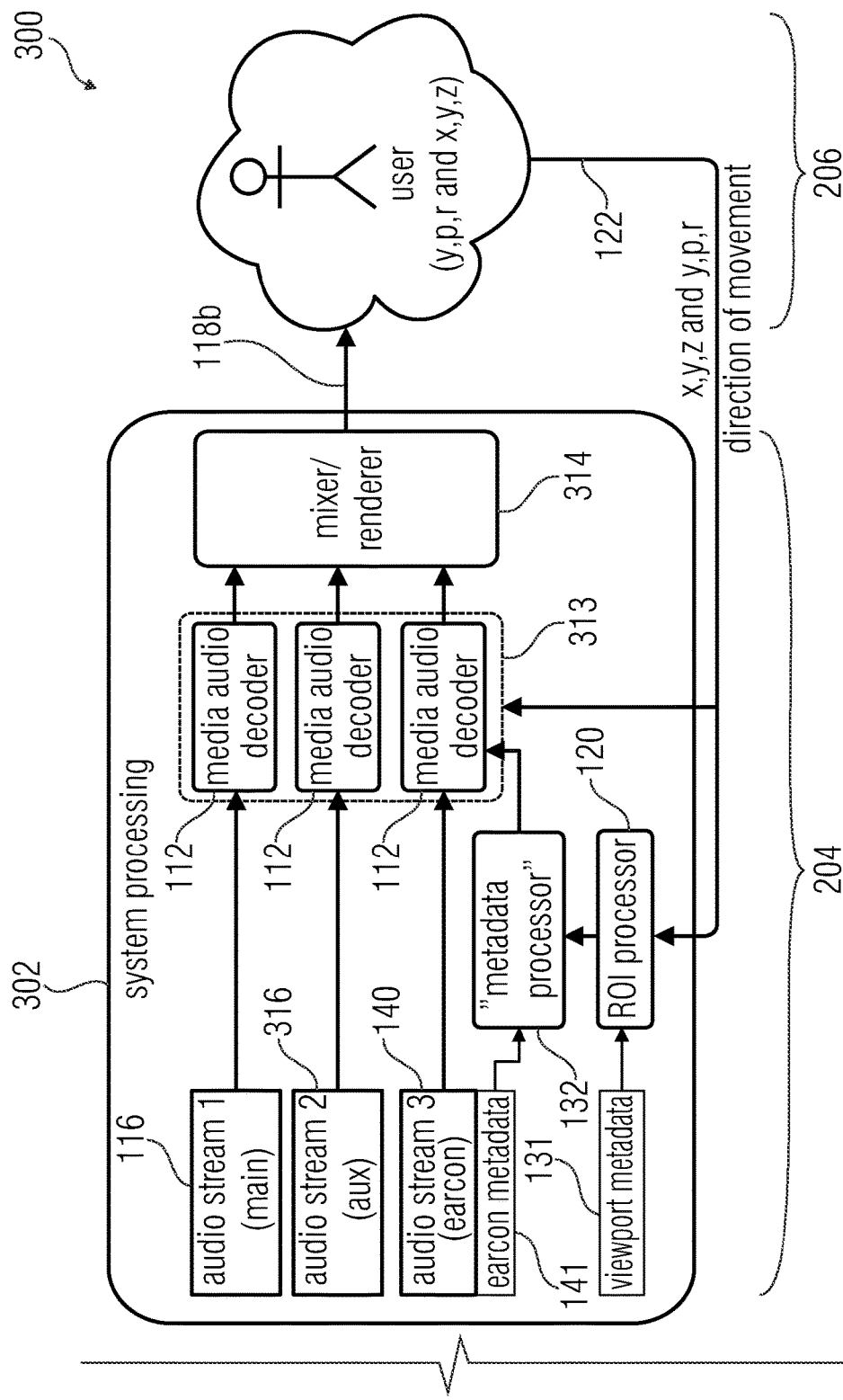
Fig. 3 (Part 2)

(Part 1)

(Part 2)

(Part 1)

(Part 2)

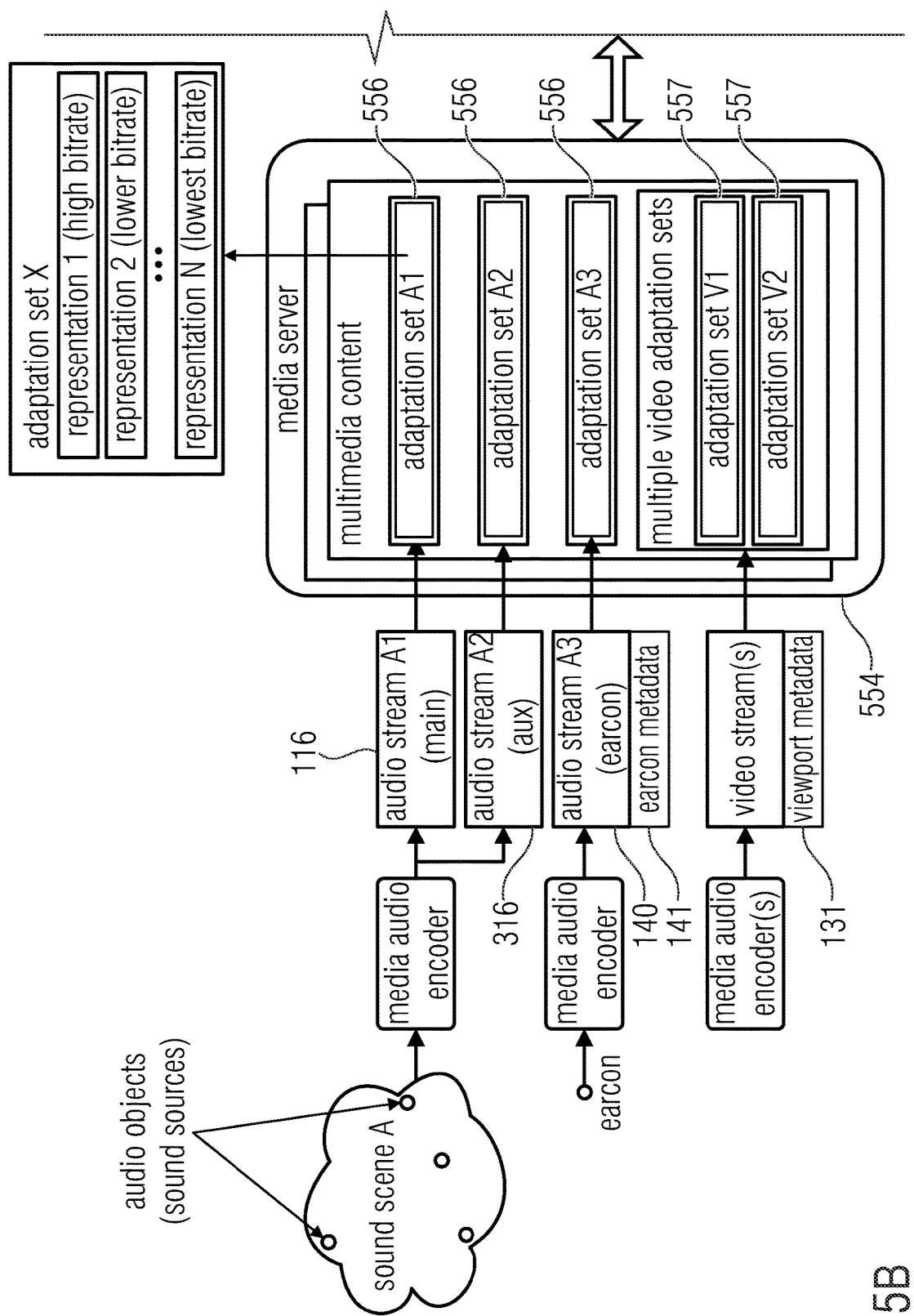
Fig. 5B (Part 1)

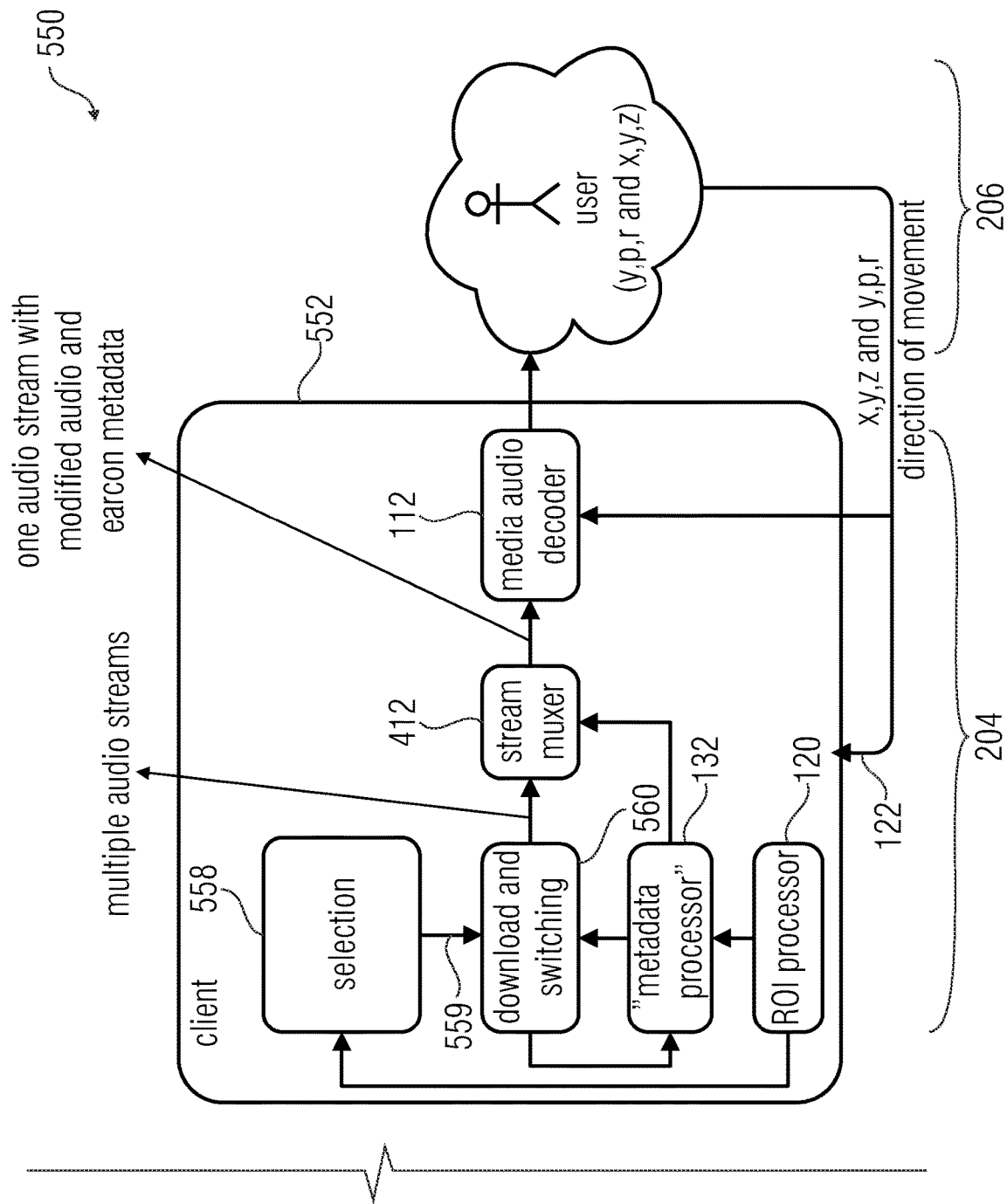
Fig. 5B (Part 2)

(Part 1)

(Part 2)

METHOD AND APPARATUS FOR EFFICIENT DELIVERY AND USAGE OF AUDIO MESSAGES FOR HIGH QUALITY OF EXPERIENCE

CROSS-REFERENCES TO RELATED APPLICATIONS

This application is a continuation of copending U.S. patent application Ser. No. 16/845,394, filed Apr. 10, 2020, which in turn is a continuation of copending International Application No. PCT/EP2018/077556, filed Oct. 10, 2018, which are both incorporated herein by reference in its entirety, and additionally claims priority from European Application No. EP17196255.8, filed Oct. 12, 2017, which is incorporated herein by reference in its entirety.

BACKGROUND OF THE INVENTION

1. Introduction

In many applications, delivery of audible messages can improve the user experience during media consumption. One of the most relevant application of such messages is given by Virtual Reality (VR) content. In a VR environment, or similarly in an Augmented Reality (AR) or Mixed Reality (MR) or 360-degree Video environments, the user can usually visualise full 360-degree content using for example a Head Mounted Display (HMD) and listen to it over headphones (or similarly over loudspeakers, including correct rendering dependent to its position). The user can usually move in the VR/AR space, or at least change the viewing direction—the so-called "viewport" for Video. In 360-degree Video environments, that use classic reproduction systems (wide display screen) instead of HMDs, remote control devices can be used for emulating the user's movement in the scene and similar principles apply. It should be noted that 360-degree content may refer to any type of content that comprises in more than one viewing angle at the same moment in time, that the user can chose from (for example by his head orientation, or using a remote control device)

Compared with classic content consumption, for VR the content creators cannot any-longer control what the user visualises at various moments in time—the current viewport. The user has the freedom to choose different viewports at each instance of time, out of the allowed or available viewports.

A common issue of VR content consumption is the risk that the user will miss the important events in the Video scene due to wrong viewport selection. For addressing this issue, the notion of Region Of Interest (ROI) was introduced and several concepts for signaling the ROI are considered. Although, the ROI is commonly used to indicate to the user the region containing the recommended viewport, it can also be used with other purposes, such as: indicating the presence of a new character/object in the scene, indicating accessibility features associated with objects in the scene, basically any feature that can be associated with an element composing the video scene. For example, visual messages (e.g., "Turn your head to left") can be used and overlaid over the current viewport. Alternatively, audible sounds can be used, either natural or synthetic sounds, by playing them back at the position of the ROI. These Audio messages are known as "Earcons".

In the context of this application the notion of Earcon will be used to characterise Audio messages conveyed for signaling the ROIs, but the signaling and the processing proposed can be used also for generic Audio messages with other purpose than signaling ROIs. One example of such Audio messages is given by Audio messages for conveying information/indication of various options the user has in an interactive AR/VR/MR environment (e.g., "jump over the box to your left for entering room X"). Additionally, the VR example will be used, but the mechanisms described in this document apply to any media consumption environment.

2. Terminology and Definitions

The following terminology is used in the technical field:

Audio Elements: Audio signals that can be represented for example as Audio objects, Audio channels, scene based Audio (Higher Order Ambisonics—HOA), or combination of all.

Region-of-Interest (ROI): One region of the video content (or of the environment displayed or simulated) that is of interest to the user at one moment in time. This can be commonly a region on a sphere for example, or a polygonal selection from a 2D map. The ROI identifies a specific region for a particular purpose, defining the borders of an object under consideration.

User position information: location information (e.g., x, y, z coordinates), orientation information (yow, pitch, roll), direction and speed of movement, etc.

Viewport: Part of the spherical Video that is currently displayed and viewed by the user.

Viewpoint: the center point of the Viewport.

360-degree video (also known as immersive video or spherical video): represents in the context of this document a video content that contains more than one view (i.e., viewport) in one direction at the same moment in time. Such content can be created, for example, using an omnidirectional camera or a collection of cameras. During playback the viewer has control of the viewing direction.

Adaptation Sets contain a media stream or set of media streams. In the simplest case, one Adaptation Set contains all audio and video for the content, but to reduce bandwidth, each stream can be split into a different Adaptation Set. A common case is to have one video Adaptation Set, and multiple audio Adaptation Sets (one for each supported language). Adaptation Sets can also contain subtitles or arbitrary metadata.

Representations allow an Adaptation Set to contain the same content encoded in different ways. In most cases, Representations will be provided in multiple bitrates. This allows clients to request the highest quality content that they can play without waiting to buffer. Representations can also be encoded with different codecs, allowing support for clients with different supported codecs.

Media Presentation Description (MPD) is an XML syntax containing information about media segments, their relationships and information that may be used to choose between them.

In the context of this application the notions of the Adaptation Sets are used more generic, sometimes referring actually to the Representations. Also, the media streams (audio/video streams) are generally encapsulated first into Media segments that are the actual media files played by the client (e.g., DASH client). Various formats can be used for the Media segments, such as ISO Base Media File Format (ISOBMFF), which is similar to the MPEG-4 container format, and MPEG-TS. The encapsulation into Media Segments and in different Representations/Adaptation Sets is independent of the methods described in here, the methods apply to all various options.

Additionally, the description of the methods in this document may be centered around a DASH Server-Client communication, but the methods are generic enough to work with other delivery environments, such as MMT, MPEG-2 Transport Stream, DASH-ROUTE, File Format for fileplayback etc.

3. Current Solutions

Current solutions are:
[1]. ISO/IEC 23008-3:2015, Information technology—High efficiency coding and media delivery in heterogeneous environments—Part 3: 3D Audio
[2]. N16950, Study of ISO/IEC DIS 23000-20 Omnidirectional Media Format
[3]. M41184, Use of Earcons for ROI Identification in 360-degree Video.

A delivery mechanisms for 360-degree content is given by the ISO/IEC 23000-20, Omnidirectional Media Format [2]. This standard specifies the media format for coding, storage, delivery, and rendering of omnidirectional images, Video and the associated Audio. It provides information about the media codecs to be used for Audio and Video compression and additional metadata information for correct consumption of the 360-degree A/V content. It also specifies constrains and requirements on the delivery channels, such as Streaming over DASH/MMT or file-based playback.

The Earcon concept was first introduced in M41184, "Use of Earcons for ROI Identification in 360-degree Video" [3], which provides a mechanism for signaling of the Earcon Audio data to the user.

However, some users have reported disappointing comments of these systems. Often, a great quantity of Earcons has resulted annoying. When the designers have reduced the number of Earcons, some users have lost important information. Notably, each user has his/her own knowledge and level of experience, and would rather have a system suitable for himself/herself. Just to give an example, each user would rather have Earcons reproduced at advantageous volume (independent, for example, from the volume used for the other Audio signals). It has been proven difficult, for the system designer, to obtain a system which provides a good level of satisfaction for all the possible users. A solution has therefore been searched for permitting an increase of satisfaction for almost all the users.

Further, it has been proven difficult to reconfigure the systems even for the designers. For example, they have experienced difficulty in preparing new releases of the Audio Streams and to update the Earcons.

Further, a restricted system imposes certain limitations on the functionality, such as the Earcons cannot be accurately identified into one Audio Stream. Moreover, the Earcons have to be active and can become annoying to the user if played back when they are not needed.

Further, the Earcon spatial information cannot be signaled nor modified by, for example, a DASH Client. Easy access to this information on the Systems level can enable additional feature for better user experience.

Moreover, there is no flexibility in addressing various types of Earcons (e.g., natural sound, synthetic sound, sound generated in the DASH Client etc).

All these issues lead to a poor user Quality of Experience. A more flexible architecture would therefore be advantageous.

SUMMARY

An embodiment may have a content consumption device system configured to receive at least one first Audio Stream associated to a scene to be reproduced,
  wherein the content consumption device system may have:
  at least one media Audio decoder configured to decode at least one Audio signal from the at least one first Audio Stream for the representation of the Audio and video scene to the user;
  a first processor configured to:
    decide, based at least on the user's movement data and/or user's selection and/or metadata, whether an Earcon is to be reproduced, wherein the Earcon is independent of the at least one Audio signal; and
    cause, at the decision that the Earcon is to be reproduced, the reproduction of the Earcon,
  wherein the content consumption device system is configured to generate and/or modify Earcon metadata;
  wherein the content consumption device system further includes an Audio generator configured to generate at least one additional Stream, in which the Earcon is encoded, based on the Earcon metadata.

Another embodiment may have a content consumption device system configured to:
  receive at least one first Audio Stream associated to an Audio scene to be reproduced,
  wherein the content consumption device system may have:
  at least one media Audio decoder configured to decode at least one Audio signal from the at least one first Audio Stream for the representation of the scene to the user;
  a metadata processor;
  a first processor, configured to:
    receive a current user's movement data and/or user's selection and/or metadata;
    decide, based at least on the user's current movement data and/or metadata and/or user's selection, whether an Earcon is to be reproduced, wherein the Earcon is independent of the at least one Audio signal, wherein the Earcon is associated to Earcon metadata and
    request, at the first processor's decision that the Earcon is to be reproduced, a modification of Earcon metadata, to the metadata processor; and
  wherein the metadata processor is configured to receive an Earcon metadata, to receive a request to modify the Earcon metadata from the first processor, and to modify the Earcon metadata to a modified Earcon metadata according to the request from the first processor,
  wherein the first processor is further configured to cause the reproduction of the Earcon according to the modified Earcon metadata,
  wherein the content consumption device system is configured to generate the Earcon metadata; and
  wherein the content consumption device system further includes an Audio generator configured to generate at least one additional Stream in which the Earcon is encoded, based on the Earcon metadata generated by the Earcon metadata generator.

4. The Present Invention

In accordance to examples, there is provided a system for a virtual reality, VR, augmented reality, AR, mixed reality, MR, or 360-degree Video environment configured to:
receive at least one Video Stream associated to an audio and video scene to be reproduced; and
receive at least one first Audio Stream associated to the audio and video scene to be reproduced,
wherein the system comprises:
at least one media Video decoder configured to decode at least one Video signal from the at least one Video Stream for the representation of the audio and video scene to a user; and
at least one media Audio decoder configured to decode at least one Audio signal from the at least one first Audio Stream for the representation of the audio and video scene to the user;
a region of interest, ROI, processor, configured to:
  decide, based at least on the user's current viewport and/or head orientation and/or movement data and/or viewport metadata and/or audio information message metadata, whether an Audio information message associated to the at least one ROI is to be reproduced, wherein the audio information message is independent of the at least one Video signal and the at least one Audio signal; and
  cause, at the decision that the information message is to be reproduced, the reproduction of the Audio information message.

In accordance to examples, there is provided a system for a virtual reality, VR, augmented reality, AR, mixed reality, MR, or 360-degree Video environment configured to:
receive at least one Video Stream; and
receive at least one first Audio Stream,
wherein the system comprises:
at least one media Video decoder configured to decode at least one Video signal from the at least one Video Stream for the representation of a VR, AR, MR or 360-degree Video environment scene to a user; and
at least one media Audio decoder configured to decode at least one Audio signal from the at least one first Audio Stream for the representation of an Audio scene to the user;
a region of interest, ROI, processor, configured to:
  decide, based on the user's current viewport and/or head orientation and/or movement data and/or viewport metadata and/or audio information message metadata, whether an Audio information message associated to the at least one ROI is to be reproduced, wherein the audio information message is an earcon; and
  cause, at the decision that the information message is to be reproduced, the reproduction of the Audio information message.

The system may be comprising:
a metadata processor configured to receive and/or process and/or manipulate audio information message metadata so as to cause, at the decision that the information message is to be reproduced, the reproduction of the Audio information message according to the audio information message metadata.

The ROI processor may be configured to:
receive a user's current viewport and/or position and/or head orientation and/or movement data and/or other user related data; and
receive viewport metadata associated with at least one Video signal from the at least one Video Stream, the viewport metadata defining at least one ROI; and
decide, based on at least one of the user's current viewport and/or position and/or head orientation and/or movement data and the viewport metadata and/or other criteria, whether an Audio information message associated to the at least one ROI is to be reproduced.

The system may be comprising:
a metadata processor configured to receive and/or process and/or manipulate Audio information message metadata describing the Audio information message and/or Audio metadata describing the at least one Audio signal encoded in the at least one Audio Stream and/or the viewport metadata, so as to cause the reproduction of the Audio information message according to the Audio information message metadata and/or Audio metadata describing the at least one Audio signal encoded in the at least one Audio Stream and/or the viewport metadata.

The ROI processor may be configured to:
in case the at least one ROI is outside the user's current viewport and/or position and/or head orientation and/or movement data, cause the reproduction of an Audio information message associated to the at least one ROI, in addition to the reproduction of the at least one Audio signal; and
in case the at least one ROI is within the user's current viewport and/or position and/or head orientation and/or movement data, disallow and/or deactivate the reproduction of the Audio information message associated to the at least one ROI.

The system may be configured to:
receive the at least one additional Audio Stream in which the at least one Audio information message is encoded,
wherein the system further comprises:
at least one muxer or multiplexer to merge, under the control of the metadata processor and/or the ROI processor and/or another processor, packets of the at least one additional Audio Stream with packets of the at least one first Audio Stream in one Stream, based on the decision provided by the ROI processor that the at least one Audio information message is to be reproduced, to cause the reproduction of the Audio information message in addition to the Audio scene.

The system may be configured to:
receive at least one Audio metadata describing the at least one Audio signal encoded in the at least one Audio Stream;
receive Audio information message metadata associated with at least one Audio information message from at least one Audio Stream;
at the decision that the information message is to be reproduced, modify the Audio information message metadata to enable the reproduction of the Audio information message, in addition to the reproduction of the at least one Audio signal.

The system may be configured to:
receive at least one Audio metadata describing the at least one Audio signal encoded in the at least one Audio Stream;
receive Audio information message metadata associated with at least one Audio information message from the at least one Audio Stream;
at the decision that the Audio information message is to be reproduced, modify the Audio information message metadata to enable the reproduction of an Audio information message in association with the at least one ROI, in addition to the reproduction of the at least one Audio signal; and modify the Audio metadata describing the at least one Audio signal to allow a merge of the at least one first Audio Stream and the at least one additional Audio Stream.

The system may be configured to:

receive at least one Audio metadata describing the at least one Audio signal encoded in the at least one Audio Stream;

receive Audio information message metadata associated with at least one Audio information message from at least one Audio Stream;

at the decision that the Audio information message is to be reproduced, providing the Audio information message metadata to a synthetic Audio generator to create a synthetic Audio Stream, so as to associate the Audio information message metadata to the synthetic Audio Stream, and to provide the synthetic Audio Stream and the Audio information message metadata to a multiplexer or muxer to allow a merge the at least one Audio Stream and the synthetic Audio Stream.

The system may be configured to:

obtain the Audio information message metadata from the at least one additional Audio Stream in which the Audio information message is encoded.

The system may be comprising:

an Audio information message metadata generator configured to generate Audio information message metadata on the basis of the decision that Audio information message associated to the at least one ROI is to be reproduced.

The system may be configured to:

store, for future use, the Audio information message metadata and/or the Audio information message Stream.

The system may be comprising:

a synthetic Audio generator configured to synthesize an Audio information message on the basis of Audio information message metadata associated to the at least one ROI.

The metadata processor may be configured to control a muxer or multiplexer to merge, on the basis of the Audio metadata and/or Audio information message metadata, packets of the Audio information message Stream with packets of the at least one first Audio Stream in one Stream to obtain an addition of the Audio information message to the at least one Audio Stream.

The Audio information message metadata may be encoded in a configuration frame and/or in a data frame including at least one of:

an identification tag,
an integer uniquely identifying the reproduction of the Audio information message metadata,
a type of the message,
a status,
an indication of dependency/non-dependency from the scene,
positional data,
gain data,
an indication of the presence of associated text label,
number of available languages,
language of the Audio information message,
data text length,
data text of the associated text label, and/or
description of the Audio information message.

The metadata processor and/or the ROI processor may be configured to perform at least one of the following operations:

extract Audio information message metadata from a Stream;
modify Audio information message metadata to activate the Audio information message and/or set/change its position;
embed metadata back in a Stream;
feed the Stream to an additional media decoder;
extract Audio metadata from the least one first Audio Stream;
extract Audio information message metadata from an additional Stream;
modify Audio information message metadata to activate the Audio information message and/or set/change its position;
modify Audio metadata of the least one first Audio Stream so as to take into consideration the existence of the Audio information message and allow merging;
feed a Stream to the multiplexer or muxer to multiplex or mux them based on the information received from the ROI processor.

The ROI processor may be configured to perform a local search for an additional Audio Stream in which the Audio information message is encoded and/or Audio information message metadata and, in case of non-retrieval, request the additional Audio Stream and/or Audio information message metadata to a remote entity.

The ROI processor may be configured to perform a local search for an additional Audio Stream and/or an Audio information message metadata and, in case of non-retrieval, cause a synthetic Audio generator to generate the Audio information message Stream and/or Audio information message metadata.

The system may be configured to:

receive the at least one additional Audio Stream in which at least one Audio information message associated to the at least one ROI is included; and
decode the at least one additional Audio Stream if the ROI processor decides that an Audio information message associated to the at least one ROI is to be reproduced.

The system may be comprising:

at least one first Audio decoder for decoding the at least one Audio signal from at least one first Audio Stream;
at least one additional Audio decoder for decoding the at least one Audio information message from an additional Audio Stream; and
at least one mixer and/or renderer for mixing and/or superimposing the Audio information message from the at least one additional Audio Stream with the at least one Audio signal from the at least one first Audio Stream.

The system may be configured to keep track of metrics associated to historical and/or statistical data associated to the reproduction of the Audio information message, so as to disable the Audio information message's reproduction if the metrics is over a predetermined threshold.

The ROI processor's decision may be based on a prediction of user's current viewport and/or position and/or head orientation and/or movement data in relationship to the position of the ROI. The system may be configured to receive the at least one first Audio Stream and, at the decision that the information message is to be reproduced, to request an Audio message information Stream from a remote entity.

The system may be configured to establish whether to reproduce two Audio information messages at the same time or whether to select a higher-priority Audio information message to be reproduced with priority with respect to a lower-priority Audio information message.

The system may be configured to identify an Audio information message among a plurality of Audio information messages encoded in one additional Audio Stream on the basis of the address and/or position of the Audio information messages in an Audio Stream.

The Audio Streams may be formatted in the MPEG-H 3D Audio Stream format.

The system may be configured to:
receive data about availability of a plurality of adaptation sets, the available adaptation sets including at least one Audio scene adaptation set for the at least one first Audio Stream and at least one Audio message adaptation set for the at least one additional Audio Stream containing at least one Audio information message;
create, based on the ROI processor's decision, selection data identifying which of the adaptation sets are to be retrieved, the available adaptation sets including at least one Audio scene adaptation set and/or at least one Audio message adaptation set; and
request and/or retrieve the data for the adaptation sets identified by the selection data,
wherein each adaptation set groups different encodings for different bitrates.

The system may be such that at least one if its elements comprises a Dynamic Adaptive Streaming over HTTP, DASH, client and/or is configured to retrieve the data for each of the adaptation set using the ISO Base Media File Format, ISO BMFF, or MPEG-2 Transport Stream, MPEG-2 TS.

The ROI processor may be configured to check correspondences between the ROI and the current viewport and/or position and/or head orientation and/or movement data so as to check whether the ROI is represented in the current viewport, and, in case the ROI is outside the current viewport and/or position and/or head orientation and/or movement data, to audibly signal the presence of the ROI to the user.

The ROI processor may be configured to check correspondences between the ROI and the current viewport and/or position and/or head orientation and/or movement data so as to check whether the ROI is represented in the current viewport, and, in case the ROI is within the current viewport and/or position and/or head orientation and/or movement data, to refrain from audibly signal the presence of the ROI to the user.

The system may be configured to receive, from a remote entity, the at least one video stream associated to the video environment scene and the at least one audio stream associated to the audio scene, wherein the audio scene is associated to the video environment scene.

The ROI processor may be configured to choose, among a plurality of audio information messages to be reproduced, the reproduction of one first audio information message before a second audio information message.

The system may be comprising a cache memory to store an audio information message received from a remote entity or generated synthetically, to reuse the audio information message at different instances of time.

The audio information message may an earcon.

The at least one video stream and/or the at least one first audio stream may be part of the current video environment scene and/or video audio scene, respectively, and independent of the user's current viewport and/or head orientation and/or movement data in the current video environment scene and/or video audio scene.

The system may be configured to request the at least one first audio stream and/or at least one video stream to a remote entity in association to the audio stream and/or video environment stream, respectively, and to reproduce the at least one audio information message on the basis of the user's current viewport and/or head orientation and/or movement data.

The system may be configured to request the at least one first audio stream and/or at least one video stream to a remote entity in association to the audio stream and/or video environment stream, respectively, and to request, to the remote entity, the at least one audio information message on the basis of the user's current viewport and/or head orientation and/or movement data.

The system may be configured to request the at least one first audio stream and/or at least one video stream to a remote entity in association to the audio stream and/or video environment stream, respectively, and to synthesize the at least one audio information message on the basis of the user's current viewport and/or head orientation and/or movement data.

The system may be configured to check at least one of additional criteria for the reproduction of the audio information message, the criteria further including a user's selection and/or a user's setting.

The system may be configured to check at least one of additional criteria for the reproduction of the audio information message, the criteria further including the state of the system.

The system may be configured to check at least one of additional criteria for the reproduction of the audio information message, the criteria further including the number of audio information message reproductions that have already been performed.

The system may be configured to check at least one of additional criteria for the reproduction of the audio information message, the criteria further including a flag in a datastream obtained from a remote entity.

In accordance to an aspect, there is provided a system comprising a client configured as the system of any of the examples above and/or below, and a remote entity configured as a server for delivering the at least one Video Stream and the at least one Audio Stream.

The remote entity may be configured to search, in a database, intranet, internet, and/or geographical network, the at least one additional Audio Stream and/or Audio information message metadata and, in case of retrieval, delivery the at least one additional Audio Stream and/or the Audio information message metadata.

The remote entity may be configured to synthesize the at least one additional Audio Stream and/or generate the Audio information message metadata.

In accordance to an aspect, there may be provided a method for a virtual reality, VR, augmented reality, AR, mixed reality, MR, or 360 degree video environment comprising: decoding at least one Video signal from the at least one video and audio scene to be reproduced to a user;
decoding at least one Audio signal from the video and audio scene to be reproduced;
deciding, based on the user's current viewport and/or head orientation and/or movement data and/or metadata, whether an Audio information message associated to the at least one ROI is to be reproduced, wherein the Audio information message is independent on the at least one Video signal and the at least one Audio signal; and causing, at the decision that the information message is to be reproduced, the reproduction of the Audio information message.

In accordance to an aspect, there may be provided a method for a virtual reality, VR, augmented reality, AR, mixed reality, MR, or 360 degree video environment comprising:

decoding at least one Video signal from the at least one Video Streamfor the representation of a VR, AR, MR or 360-degree Video environment scene to a user;

decoding at least one Audio signal from the at least one first Audio Stream for the representation of an Audio scene to the user;

deciding, based on the user's current viewport and/or head orientation and/or movement data and/or metadata, whether an Audio information message associated to the at least one ROI is to be reproduced, wherein the Audio information message is an earcon; and causing, at the decision that the information message is to be reproduced, the reproduction of the Audio information message.

The methods above and/or below may be comprising:

receiving and/or processing and/or manipulating metadata so as to cause, at the decision that the information message is to be reproduced, the reproduction of the Audio information message according to the metadata in such a way that the Audio information message is part of the Audio scene.

The methods above and/or below may be comprising:

reproducing the audio and video scene; and deciding to further reproduce the audio information message on the basis of the user's current viewport and/or head orientation and/or movement data and/or metadata.

The methods above and/or below may be comprising:

reproducing the audio and video scene; and in case the at least one ROI is outside the user's current viewport and/or position and/or head orientation and/or movement data, cause the reproduction of an Audio information message associated to the at least one ROI, in addition to the reproduction of the at least one Audio signal; and/or in case the at least one ROI is within the user's current viewport and/or position and/or head orientation and/or movement data, disallow and/or deactivate the reproduction of the Audio information message associated to the at least one ROI.

In accordance to examples, there is provided a system for a virtual reality, VR, augmented reality, AR, mixed reality, MR, or 360-degree Video environment configured to:

receive at least one Video Stream; and receive at least one first Audio Stream, wherein the system comprises:

at least one media Video decoder configured to decode at least one Video signal from the at least one Video Stream for the representation of a VR, AR, MR or 360-degree Video environment scene to a user; and at least one media Audio decoder configured to decode at least one Audio signal from the at least one first Audio Stream for the representation of an Audio scene to the user;

a region of interest, ROI, processor, configured to:

decide, based on the user's current viewport and/or head orientation and/or movement data and/or the metadata, whether an Audio information message associated to the at least one ROI is to be reproduced; and cause, at the decision that the information message is to be reproduced, the reproduction of the Audio information message.

In examples, there is provided a system for a virtual reality, VR, augmented reality, AR, mixed reality, MR, or 360-degree Video environment configured to:

receive at least one Video Stream; and receive at least one first Audio Stream, wherein the system comprises:

at least one media Video decoder configured to decode at least one Video signal from the at least one Video Stream for the representation of a VR, AR, MR or 360-degree Video environment scene to a user; and at least one media Audio decoder configured to decode at least one Audio signal from the at least one first Audio Stream for the representation of an Audio scene to a user;

a region of interest, ROI, processor, configured to decide, based on the user's current viewport and/or position and/or head orientation and/or movement data and/or metadata and/or other criteria, whether an Audio information message associated to the at least one ROI is to be reproduced; and a metadata processor configured to receive and/or process and/or manipulate metadata so as to cause, at the decision that the information message is to be reproduced, the reproduction of the Audio information message according to the metadata in such a way that the Audio information message is part of the Audio scene.

According to an aspect, there is provided a non-transitable storage unit comprising instructions which, when executed by a processor, cause the processor to perform a method as above and/or below.

5. Description of the Drawings

BRIEF DESCRIPTION OF THE DRAWINGS

Embodiments of the present invention will be detailed subsequently referring to the appended drawings, in which:

FIGS. 1-4, 5A-B, and 6 show examples of implementations;

DETAILED DESCRIPTION OF THE DRAWINGS

6. Examples 6.1 General Examples

Figure 1:
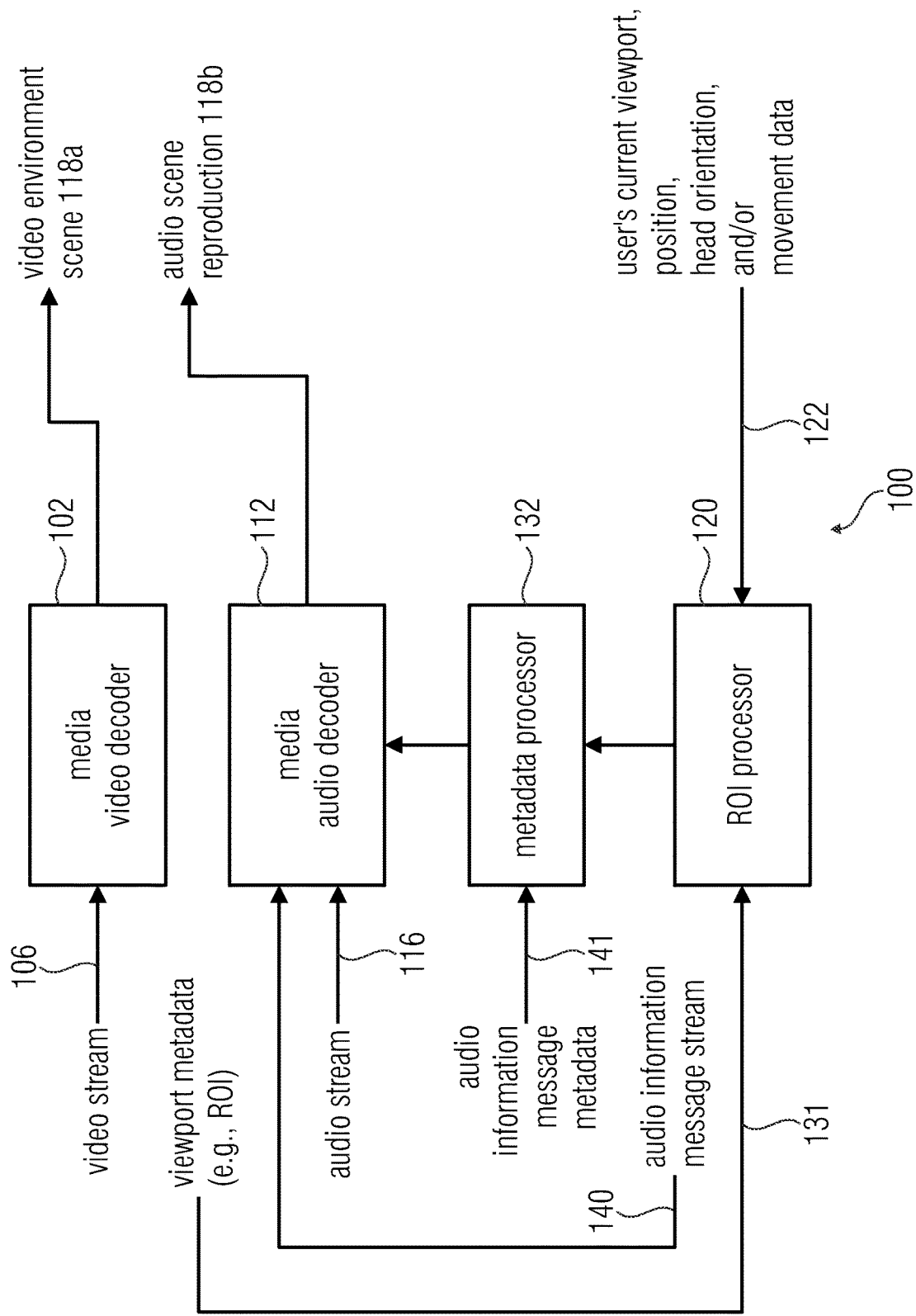

FIG. 1 shows an example of a system 100 for a virtual reality, VR, augmented reality, AR, mixed reality, MR, or 360-degree Video environment. The system 100 may be associated, for example, to a content consumption device (e.g., Head-Mounted Display or the like), which reproduces visual data in a spherical or hemispherical display intimately associated to the head of the user. The system 100 may comprise at least one media Video decoder 102 and at least one media Audio decoder 112. The system 100 may receive at least one Video Stream 106 in which a Video signal is encoded for the representation of a VR, AR, MR or 360-degree Video environment scene 118a to a user. The system 100 may receive at least one first Audio Stream 116, in which an Audio signal is encoded for the representation of an Audio scene 118b to a user.

The system 100 may also comprise a region of interest, ROI, processor 120. The ROI processor 120 may process data associated to a ROI. In general terms, the presence of the ROI may be signalled in viewport metadata 131. The viewport metadata 131 may be encoded in the Video Stream 106 (in other examples, the viewport metadata 131 may be encoded in other Streams). The viewport metadata 131 may comprise, for example, positional information (e.g., coordinate information) associated to the ROI. For example, the ROI may, in examples, be understood as a rectangle (identified by coordinates such as the position of one of the four vertexes of the rectangles in the spherical Video and the length of the sides of the rectangle). The ROI is normally projected in the spherical Video. The ROI is normally associated to a visible element which is believed (according to a particular configuration) to be of interest of the user. For example, the ROI may be associated to a rectangular area displayed by the content consumption device (or somehow visible to the user).

The ROI processor 120 may, inter alia, control operations of the media Audio decoder 112. The ROI processor 120 may obtain data 122 associated to the user's current viewport and/or position and/or head orientation and/or movement (also virtual data associated to the virtual position may understood, in some examples, as being part of data 122). These data 122 may be provided at least partially, for example, by the content consumption device, or by positioning/detecting units.

The ROI processor 120 may check correspondences between the ROI and the user's current viewport and/or position (actual or virtual) and/or head orientation and/or movement data 122 (in examples, other criteria may be used). For example, the ROI processor may check if the ROI is represented in the current viewport. In case a ROI is only partially represented in the viewport (e.g., on the basis of the user's head movements), it may determined, for example, if a minimum percentage of the ROI is displayed in the screen. In any case, the ROI processor 120 is capable of recognizing if the ROI is not represented or visible to the user.

In case the ROI is considered to be outside the user's current viewport and/or position and/or head orientation and/or movement data 122, the ROI processor 120 may audibly signal the presence of the ROI to the user. For example, the ROI processor 120 may request the reproduction of an Audio information message (Earcon) in addition to the Audio signal decoded from the at least one first Audio Stream 116.

In case the ROI is considered to be within the user's current viewport and/or position and/or head orientation and/or movement data 122, the ROI processor may decide to avoid the reproduction of the Audio information message.

The Audio information message may be encoded in an Audio Stream 140 (Audio information message Stream), which may be the same of the Audio Stream 116 or a different Stream. The Audio Stream 140 may be generated by the system 100 or may be obtained from an external entity (e.g., server). Audio Metadata, such as Audio information message metadata 141, may be defined for describing properties of the Audio information Stream 140.

The Audio information message may be superposed (or mixed or muxed or merged or combined or composed) to the signal encoded in the Audio Stream 116 or may not be selected, e.g., simply on the basis of a decision of the ROI processor 120. The ROI processor 120 may base its decision on the viewport and/or position and/or head orientation and/or movement data 122, metadata (such as the viewport metadata 131 or other metadata) and/or other criteria (e.g., selections, state of the system, number of Audio information message reproductions that have been already performed, particular functions and/or operations, settings that may be advantageous to the user and that can disable the usage of Earcons and so on).

A metadata processor 132 may be implemented. The metadata processor 132 may be interposed, for example, between the ROI processor 120 (by which it may be controlled) and the media Audio decoder 112 (which may be controlled from the metadata processor). In examples, the metadata processor is a section of the ROI processor 120. The metadata processor 132 may receive, generate, process and/or manipulate the Audio information message metadata 141. The metadata processor 132 may also process and/or manipulate metadata of the Audio Stream 116, for example for muxing the Audio Stream 116 with the Audio information message Stream 140. In addition or alternative, the metadata processor 132 may receive metadata of the Audio Stream 116, for example from a server (e.g., a remote entity).

The metadata processor 132 may therefore change the Audio scene reproduction and adapt the Audio information message to particular situations and/or selections and/or states.

Some of the advantages of some implementations are here discussed.

The Audio information messages can be accurately identified, e.g., using the Audio information message metadata 141.

The Audio information messages may be easily activated/deactivated, e.g., by modifying the metadata (e.g., by the metadata processor 132). The Audio information messages may be, for example, enabled/disabled based on the current viewport and the ROI information (and also special functions or effects that are to be achieved).

Audio information message (containing for example status, type, spatial information and so on) can be easily signalled and modified by common equipment, such as a Dynamic Adaptive Streaming over HTTP (DASH) Client, for example.

Easy access to the Audio information message (containing for example status, type, spatial information and so on) on the systems level can therefore enable additional feature for better user experience. Hence, the system 100 may be easily customized and permit further implementations (e.g., specific applications) which may be performed by personnel which is independent from the designers of the system 100.

Moreover, flexibility is achieved in addressing various types of Audio information messages (e.g., natural sound, synthetic sound, sound generated in the DASH Client etc.).

Other advantages (which will be also apparent with the following examples):
- Usage of text labels in the metadata (as the basis for displaying something or generating the Earcon)
- Adaptation of the Earcon position based on the device (if is an HMD I want an accurate location, if is loudspeaker maybe a better way is to use a different location—direct into one loudspeaker).
- Different device classes:
  - The Earcon metadata can be created in such a way that the Earcon is signaled to be active
  - Some devices will know only how to parse the metadata and reproduce the Earcon Some newer devices that additionally have a better ROI processor can decide to deactivate it in case is not needed More information and an additional figure about the adaptation sets.

Therefore, in a VR/AR environment the user can usually visualize full 360-degree content using for example a Head Mounted Display (HMD) and listen to it over headphones. The user can usually move in the VR/AR space or at least change the viewing direction—the so-called "viewport" for video. Compared with classic content consumption, for VR the content creators cannot any-longer control what the user visualizes at various moments in time—the current viewport. The user has the freedom to choose different viewports at each instance of time, out of the allowed or available viewports. In order to indicate to the user the Region Of Interest (ROI), audible sounds can be used, either natural or synthetic sounds, by playing them back at the position of the ROI. These audio messages are known as "Earcons". This invention proposes a solution for efficient delivery of such messages and proposes an optimized receiver behaviour for making use of the Earcons without affecting the user experience and the content consumption. This leads to an increased Quality of Experience. This can be achieved by using dedicated metadata and metadata manipulation mechanisms on systems level for enabling or disabling the Earcons in the final scene.

The metadata processor 132 may be configured to receive and/or process and/or manipulate metadata 141 so as to cause, at the decision that the information message is to be reproduced, the reproduction of the Audio information message according to the metadata 141. Audio signals (e.g., those for representing the scene) may be understood as being part of the audio scene (e.g., an audio scene downloaded from a remote server). Audio signals may be in general semantically meaningful for the audio scene and all audio signals present together construct the audio scene. Audio signals may be encoded together in one audio bitstream. Audio signals may be created by the content creator and/or may be associated to the particular scene and/or may be independent from the ROI.

The audio information message (e.g., earcon) may be understood as not semantically meaningful to the audio scene. It may be understood as an independent sound that can be generated artificially, such as recorded sound, a recorder voice of a person, etc. It can be also device-dependent (a system-sound generated at the press of a button on the remote control, for example). The audio information message (e.g., earcon) may be understood as being meant to guide the user in the scene, without being part of the scene.

The audio information message may be independent of the audio signals as above. According to different examples, it may be either included in the same bitstream, or transmitted in a separate bitstream, or generated by the system 100.

An example of an audio scene composed of multiple audio signals may be:

Audio Scene a concert room which contains 5 audio signals:
Audio Signal 1: The sound of a piano
Audio Signal 2: The voice of the singer
Audio Signal 3: The voice of Person 1 part of the audience
Audio Signal 4: The voice of Person 2 part of the audience
Audio Signal 5: The sound created by the clock on the wall The audio information message may be, for example, a recorded sound like "look to the piano player" (the piano being the ROI). If the user is already looking at the piano player, the audio message will not be playedback.

Another example: a door (e.g., a virtual door) is opened behind the user and a new person enters the room; the user is not looking there. The Earcon can be triggered, based on this (information regarding the VR environment, such as virtual position), to announce the user that something happens behind him.

In examples, each scene (e.g., with the related audio and video streams) is transmitted from the server to the client when the user changes the environment.

The audio information message may be flexible. In particular:
the audio information message can be located in the same audio stream associated to the scene to be reproduced;
the audio information message can be located in an additional audio stream;
the audio information message can be completely missing, but only the metadata describing the earcon can be present in the stream and the audio information message can be generated in the system;
the audio information message can be completely missing as well as the metadata describing the audio information message, in which case the system generates both (the earcon and the metadata) based on other information about the ROI in the stream.

The Audio information message is in general independent of any Audio Signal part of the Audio Scene and not is not used for the representation of the Audio Scene.

Examples of systems embodying or including parts which embody system 100 are provided below.

6.2 the Example of FIG. 2

FIG. 2 shows a system 200 (which may contain at least a part embodying system 100) which is here represented as being subdivided into a server side 202, a media delivery side 203, a client side 204, and/or a media consumption device side 206. Each of the sides 202, 203, 204, and 206 is a system itself and may be combined with any other system to obtain another system. Here, the Audio information messages are referred to as Earcons, even if it is possible to generalize them to any kind of Audio information messages.

The client side 204 may receive the at least one Video Stream 106 and/or the at least one Audio Stream 116 from the server side 202 though a media delivery side 203.

The delivery side 203 may be, for example, based on a communication system such as a cloud system, a network system, a geographical communication network or well-known media transport formats (MPEG-2 TS Transport Stream, DASH, MMT, DASH ROUTE etc) or even a file based storage. The delivery side 203 may be capable of performing communications in form of electric signals (e.g., on cable, wireless etc) and/or by distributing data packets (e.g., according to a particular communication protocol) with bitStreams in which Audio and Video signals are encoded. The delivery side 203 may however be embodied by a point-to-point link, a serial or parallel connection, and so on. The delivery side 203 may perform a wireless connection e.g., according to protocols such as WiFi, Bluetooth, and so on.

The client side 204 may be associated to a media consumption device, e.g., a HND, for example, into which the user's head may be inserted (other devices may be used, however). Therefore, the user may experience a Video and Audio scene (e.g., a VR scene) prepared by the client side 204 on the basis of Video and Audio data provided by the server side 202. Other implementations are, however, possible.

The server side 202 is here represented as having a media encoder 240 (that can cover Video encoders, Audio encoders, subtitle encoders, etc). This encoder 240 may be associated, for example, to an Audio and Video scene to be represented. The Audio scene may be, for example, for recreating an environment and is associated to the at least one Audio and Video data Streams 106, 116, which may be encoded on the basis of the position (or virtual position) reached by the user in the VR, AR, MR environment. In general terms, the Video Stream 106 encodes spherical images, only a part of which (viewports) will be seen by the user in accordance to its position and movements. The Audio Stream 116 contains Audio data which participates to the Audio scene representation and is meant at being heard by a user. According to examples, the Audio Stream 116 may comprise Audio metadata 236 (which refer to the at least one Audio signal that is intended to participate to the Audio scene representation) and/or Earcon metadata 141 (which may describe Earcons to be reproduced only in some cases).

The system 100 is here represented as being at the client side 204. For simplicity, the media Video decoder 112 is not represented in FIG. 2.

In order to prepare the reproduction of the Earcon (or other Audio information messages), Earcon metadata 141 may be used. The Earcon metadata 141 may be understood as metadata (which may be encoded in an Audio Stream) which describe and provide attributes associated to the Earcon. Hence, the Earcon (if to be reproduced) may be based on the attributes of the Earcon metadata 141.

Advantageously, the metadata processor 132 may specifically be implemented for processing the Earcon metadata 141. For example, the metadata processor 132 may control the reception, processing, manipulation, and/or the generation of the Earcon metadata 141. When processed, the Earcon metadata may be represented as modified Earcon metadata 234. For example, it is possible to manipulate the Earcon metadata for obtaining a particular effect, and/or for performing Audio processing operations, such as multiplexing or muxing, for adding the Earcon to the Audio signal to be represented in the Audio scene.

The metadata processor 132 may control the reception, processing, manipulation of the Audio metadata 236 associated to the at least one Stream 116. When processed, the Audio metadata 236 may be represented as modified Audio metadata 238.

The modified metadata 234 and 238 may be provided to the media Audio decoder 112 (or a plurality of decoders in some examples) for the reproduction of the Audio scene 118b to the user. In examples, there may be provided, as an optional component, a synthetic Audio generator and/or storing device 246. The generator may synthesize an Audio Stream (e.g., for generating an Earcon which is not encoded in a Stream). The storing device permits to store (e.g., in a cache memory) Earcon Streams (e.g., for future use) which have been generated by the generator and/or obtained in a received Audio Stream.

Hence, the ROI processor 120 may decide for the representation of an Earcon on the basis of the user's current viewport and/or position and/or head orientation and/or movement data 122. However, the ROI processor 120 may also base its decision on criteria which involve other aspects.

For example, the ROI processor may enable/disable the Earcon reproduction on the basis of other conditions, such as, for example, user's selections or higher layer selections, e.g., on the basis of the particular application that is intended to be consumed. For a Video game application, for example, Earcons or other Audio information messages may be avoided for high-Videogame-levels. This may be simply obtained, by the metadata processor, by disabling the Earcons in the Earcon metadata.

Further, it is possible to disable the Earcons on the basis of the state of the system: if, for example, the Earcon has already been reproduced, its repetition may be inhibited. A timer may be used, for example, for avoiding too quick repetitions.

The ROI processor 120 may also request the controlled reproduction of a sequence of Earcons (e.g., the Earcons associated to all the ROIs in the scene), e.g., for instructing the user on the elements which he/she may see. The metadata processor 132 may control this operation.

The ROI processor 120 may also modify the Earcon position (i.e., the spatial location in the scene) or the Earcon type. For example, some users may rather have as Earcon one specific sound play back at the exact location/position of the ROI, while other users can rather have the Earcon played-back at one fixed location (e.g., center, or top position "voice of God" etc) as a vocal sound indication the position where the ROI is located.

It is possible to modify the gain (e.g., to obtain a different volume) of the Earcon's reproduction. This decision may follow a user's selection, for example. Notably, on the basis of the ROI processor's decision, the metadata processor 132 will perform the gain modification by modifying, among the Earcon metadata associated to the Earcon, the particular attribute associated to the gain.

The original designer of the VR, AR, MR environment may also be unaware of how the Earcons will be actually reproduced. For example, user's selections may modify the final rendering of the Earcons. Such an operation may be controlled, for example, by the metadata processor 132 which may modify the Earcon metadata 141 on the basis of the ROI processor's decisions.

Thus, the operations performed on the Audio data associated to the Earcon are therefore in principle independent of the at least one Audio Stream 116 used for representing the Audio scene and may be differently managed. The Earcons may even be generated independently of the Audio and Video Streams 106 and 116 which constitute the Audio and Video scene and may be produced by different and independent entrepreneurial groups.

Hence, the examples permit to increase the satisfaction for users. For example, a user may perform his/her own selections, e.g., by modifying the volume of the Audio information messages, by disabling the Audio information messages, and so on. Therefore, each user may have the experience more suited to his/her preference. Further, the obtained architecture is more flexible. The Audio information messages may be easily updated, for example, by modifying the metadata, independently of the Audio Streams, and/or by modifying the Audio information message Streams independently of the metadata and of the main Audio Streams.

The obtained architecture is also compatible with legacy systems: legacy Audio information message Streams may be associated to new Audio information message metadata, for example. In case of absence of a suitable Audio information message Stream, in examples the latter may be easily synthesized (and, for example, stored for subsequent use).

The ROI processor may keep track of metrics associated to historical and/or statistical data associated to the reproduction of the Audio information message, so as to disable the Audio information message's reproduction if the metrics is over a predetermined threshold (this may be used as criteria).

The ROI processor's decision may be based, as a criteria, on a prediction of user's current viewport and/or position and/or head orientation and/or movement data 122 in relationship to the position of the ROI.

The ROI processor may be further configured to receive the at least one first Audio Stream 116 and, at the decision that the information message is to be reproduced, to request an Audio message information Stream from a remote entity.

The ROI processor and/or the metadata generator may be further configured to establish whether to reproduce two Audio information messages at the same time or whether to select a higher-priority Audio information message to be reproduced with priority with respect to a lower-priority Audio information message. In order to perform this decision, Audio information metadata may be used. A priority may be, for example, obtained by the metadata processor 132 on the basis of the values in the audio information message metadata.

In some examples, the media encoder 240 may be configured to search, in a database, intranet, internet, and/or geographical network, an additional Audio Stream and/or Audio information message metadata and, in case of retrieval, delivery the additional Audio Stream and/or the Audio information message metadata. For example, the search may be performed on the request of the client side.

As explained above, a solution is here proposed for efficient delivery of Earcon messages together with the Audio content. An optimised receiver behaviour is obtained, for making use of the Audio information messages (e.g., Earcons) without affecting the user experience and the content consumption. This will lead to an increased Quality of Experience.

This can be achieved by using dedicated metadata and metadata manipulation mechanisms on systems level for enabling or disabling of the Audio information messages in the final Audio scenes. The metadata can be used together with any Audio codecs and complements in a nice fashion the Next Generation Audio codecs metadata (e.g., MPEG-H Audio metadata).

The delivery mechanisms can be various (e.g., Streaming over DASH/HLS, broadcast over DASH-ROUTE/MMT/MPEG-2 TS, file playback etc). In this application DASH delivery is considered, but all concepts are valid for the other delivery options.

In most of the cases the Audio information messages will not overlap in time domain, i.e., at a specific point in time only one ROI is defined. But, considering more advanced use cases, for example in an interactive environment where the user can change the content based on his selections/movements, there could be also use cases which involve multiple ROIs. For this purpose, more than one Audio information message can be involved at one moment in time. Therefore, a generic solution is described for supporting all different use cases.

The delivery and processing of the Audio information messages should complement the existing delivery methods for Next Generation Audio.

One way of conveying multiple Audio information messages for several ROIs, which are independent in time domain, is to mix together all Audio information messages into one Audio element (e.g., Audio object) with associated metadata describing the spatial position of each Audio information message at different instances of time. Because the Audio information messages don't overlap in time, they can be independently addressed in the one, shared Audio element. This Audio element could contain silence (or no Audio data) in-between the Audio information messages, i.e., whenever there is no Audio information message. The following mechanisms may apply in this case:

The common Audio information message Audio element can be delivered in the same elementary Stream (ES) with the Audio scene to which it relates, or it can be delivered in one auxiliary Stream (dependent or not-dependent on the main Stream).

- If the Earcon Audio element is delivered in an auxiliary Stream dependent on the main Stream, the Client can request the additional Stream whenever a new ROI is present in the visual scene.
- The Client (e.g., the system 100) can, in examples, request the Stream in advance of the scene involving the Earcon.
- The Client can, in examples, request the Stream based on the current viewport, i.e., if the current viewport is matching the ROI the Client can decide not to request the additional Earcon Stream.
- If the Earcon Audio element may be delivered in an auxiliary Stream independent of the main Stream, the Client can request, as before, the additional Stream whenever a new ROIs is present in the visual scene. Additionally, the two (or more) Streams can be processed using two Media Decoders and a common Rendering/Mixing step for mixing the decoded Earcon Audio data into the final Audio scene. Alternatively, a Metadata Processor can be used for modifying the metadata of the two Streams and a "Stream Merger" for merging the two Streams. A possible implementation of such Metadata Processor and Stream Merger is described in the following.

In alternative examples, multiple Earcons for several ROIs, independent in time domain or overlapping in time domain, can be delivered in multiple Audio elements (e.g., Audio objects) and embedded either in one elementary Stream together with the main Audio scene or in multiple auxiliary Streams, e.g., each Earcon in one ES or a group of Earcons in one ES based on a shared property (e.g., all Earcons located on the left side share one Stream).

- If all Earcon Audio elements are delivered in several auxiliary Streams dependent on the main Stream (e.g., one Earcon per Stream or a group of Earcons per Stream), the Client can, in examples, request one additional Stream, which contains the desired Earcon, whenever the associated ROI with that Earcon is present in the visual scene.
- The Client can, in examples, request the Stream with the Earcon in advance of the scene involving that Earcon (e.g., on the basis of the movements of the user, the ROI processor 120 may perform the decision even if the ROI is not part of the scene yet).
- The Client, in examples, can request the Stream based on the current viewport, if the current viewport is matching the ROI the Client can decide not to request the additional Earcon Stream
- If one Earcon Audio element (or a group of Earcons) is delivered in an auxiliary Stream independent on the main Stream, the Client can, in examples, request, as before, the additional Stream whenever a new ROI is present in the visual scene. Additionally, the two (or more) Streams can be processed using two Media Decoders and a common Rendering/Mixing step for mixing the decoded Earcon Audio data into the final Audio scene. Alternatively, a Metadata Processor can be used for modifying the metadata of the two Streams and a "Stream Merger" for merging the two Streams. A possible implementation of such Metadata Processor and Stream Merger is described in the following.

Alternatively, one common (generic) Earcon can be used for signaling all the ROIs in one Audio scene. This can be achieved by using the same Audio content with different spatial information associated with the Audio content at different instances of time. In this case, the ROI processor 120 may request the metadata processor 132 to gather the Earcons associated to the ROIs in the scene, and to control the reproduction of the Earcons in sequence (e.g., at a user's selection or at a higher-layer application request).

Alternatively, one Earcon can be transmitted only once and cached in the Client. The Client can re-use it for all the ROIs in one Audio scene with different spatial information associated with the Audio content at different instances of time.

Alternatively, the Earcon Audio content can be generated synthetically in the Client. Together with that, a Metadata Generator can be used for creating the metadata that may be used for signaling the spatial information of the Earcon. For example, the Earcon Audio content can be compressed and fed into one Media decoder together with the main Audio content and the new metadata or it can be mixed into the final Audio scene after the Media Decoder, or several Media Decoders can be used.

Alternatively, the Earcon Audio content can, in examples, be generated synthetically in the Client (e.g., under the control of the metadata processor 132), while the Metadata describing the Earcon is embedded already in the Stream. Using specific signaling of the Earcon type in the encoder, the metadata can contain the spatial information of the Earcon, the specific singling for a "Decoder generated Earcon" but no Audio data for the Earcon. Alternatively, the Earcon Audio content can be generated synthetically in the Client, and a Metadata Generator can be used for creating the metadata that may be used for signaling the spatial information of the Earcon. For example, the Earcon Audio content can be

- compressed and fed into one Media decoder together with the main Audio content and the new metadata;
- or it can be mixed into the final Audio scene after the Media Decoder;
- or several Media Decoders can be used.

6.3 Examples of Metadata for Audio Information Messages (e.g., Earcons)

An example of Audio information message (Earcons) metadata 141, as described above, is provided here.

One structure for describing the Earcon properties and offer possibility to easily adjust these values:

| Syntax | No. of bits | Mnemonic |
|---|---|---|
| EarconInfo( ) | | |
| { | | |
|   numEarcons | 7 | uimsbf |
|   for ( i=0; i< numEarcons; i++ ) { | | |
|     Earcon_isIndependent[i]; /* independent of the Audio Scene */ | 1 | uimsbf |
|     Earcon_id[i]; /* map to group_id */ | 7 | uimsbf |
|     EarconType[i];/* natural vs sythetic sound; generic vs individual */ | 4 | uimsbf |
|     EarconActive[i]; /* default disabled */ | 1 | bsibf |
|     EarconPosition[i]; /* position change */ | 1 | bslbf |
|     if ( EarconPosition[i] ) { | | |
|       Earcon_azimuth[i]; | 8 | uimsbf |
|       Earcon_elevation[i]; | 6 | uimsbf |
|       Earcon_radius[i]; | 4 | uimsbf |
|     } | | |
|     EarconHasGain; /* gain change */ | 1 | bslbf |
|     if ( EarconHasGain ) { | | |
|       Earcon_gain[i]; | 7 | uimsbf |
|     } | | |
|     EarconHasTextLabel; /*Text Label */ | 1 | bslbf |
|     if (EarconHasTextLabel) { | | |
|       Earcon_numLanguages[i]; | 4 | uimsbf |
|       for ( n=0; n< Earcon_numLanguages[i]; n++ ) { | | |
|         Earcon_Language[i] [n]; | 24 | uimsbf |
|         Earcon_TextDataLength[i] [n]; | 8 | uimsbf |
|         for ( c=0; c< Earcon_TextDataLength[i][n]; c++ ) { | | |
|           Earcon_TextData[i][n][c]; | 8 | uimsbf |
|         } | | |
|       } | | |
|     } | | |
|   } | | |
| } | | |

Each identifier in the table may be intended as being associated to an attribute of the Earcon metadata 132.

The Semantics is here discussed.

numEarcons—This field specifies the number of Earcons Audio Elements available in the Stream.

Earcon_isIndependent—This flag defines if the Earcon Audio Element is independent from any Audio Scene. If Earcon_isIndependent==1 the Earcon Audio Element is independent from the Audio Scene. If Earcon_isIndependent==0 the Earcon Audio Element is part of the Audio Scene and the Earcon_id shall have the same value as the mae_groupID associated with the Audio Element.

EarconType—This field defines the type of the Earcon. The following table specifies the allowed values

| EarconType | description |
|---|---|
| 0 | undefined |
| 1 | natural sound |
| 2 | synthetic sound |
| 3 | spoken text |
| 4 | generic Earcon |
| 5 | /* reserved */ |
| 6 | /* reserved */ |
| 7 | /* reserved */ |
| 8 | /* reserved */ |
| 9 | /* reserved */ |
| 10 | /* reserved */ |
| 11 | /* reserved */ |
| 12 | /* reserved */ |
| 13 | /* reserved */ |
| 14 | /* reserved */ |
| 15 | other |

EarconActive This flag defines if the Earcon is active. If EarconActive==1 the Earcon Audio element shall be decoded and rendered into the Audio scene.

EarconPosition This flag defines if the Earcon has position information available. If Earcon_isIndependent==0, this position information shall be used instead of the Audio object_metadata specified in the dynamic_object_metadata( ) or intracoded_object_metadata_efficient( ) structures.

Earcon_azimuth the absolute value of the azimuth angle.

Earcon_elevation the absolute value of the elevation angle.

Earcon radius the absolute value of the radius.

EarconHasGain This flag defines if the Earcon has a different Gain value.

Earcon_gain This field defines the absolute value for the gain for the Earcon.

EarconHasTextLabel This flag defines if the Earcon has a text label associated.

Earcon_numLanguages This field specifies the number of available languages for the description text label.

Earcon_Language This 24-bit field identifies the language of the description text of an Earcon. It contains a 3-character code as specified by ISO 639-2. Both ISO 639-2/B and ISO 639-2/T may be used. Each character is coded into 8 bits according to ISO/IEC 8859-1 and inserted in order into the 24-bit field. EXAMPLE: French has 3-character code "fre", which is coded as: "0110 0110 0111 0010 0110 0101".

Earcon_TextDataLength This field defines the length of the following group description in the bit Stream.

Earcon_TextData This field contains a description of an Earcon, i.e. a string describing the content by a high-level description. The format shall follow UTF-8 according to ISO/IEC 10646.

One structure for identifying the Earcons on system level and associate them with existing viewports. The following two tables offer two ways of implementing such structure that can be used in different implementations:

aligned(8) class EarconSample( ) extends SphereRegionSample {
    for (i=0; i<num_regions; i++) {
        unsigned int(7) reserved;
        unsigned int(1) hasEarcon;
        if (hasEarcon==1) {
            unsigned int(8) numRegionEarcons;
            for (n=0; n<numRegionEarcons; n++) {
                unsigned int(8) Earcon_id;
                unsigned int(32) Earcon_track_id;
            }
        }
    }
} or alternatively:
aligned(8) class EarconSample( ) extends SphereRegionSample {
    for (i=0; i<num_regions; i++) {
        unsigned int(32) Earcon_track_id;
        unsigned int(8) Earcon_id;
    }
}

Semantics:

hasEarcon specifies if Earcon data is available for one region.

numRegionEarcons specifies the number of Earcons available for one region.

Earcon_id uniquely defines an ID for one Earcon element associated with the sphere region. If the Earcon is part of the Audio Scene (i.e., the Earcon is part of one group of elements identified by one mae_groupID), the Earcon_id SHALL have same value as the mae_groupID. The Earcon_id can be used for identification in of the Audio file/track, for example in case of DASH delivery, the AdaptationSet with EarconComponent@tag element in the MPD equal with the Earcon_id.

Earcon_track_id—is an integer that uniquely identifies one Earcon track associated with the sphere region over the entire life-time of one presentation, i.e., if the Earcon(s) track is delivered in the same ISO BMFF file, the Earcon_track_id represents the corresponding track_id of the Earcon(s) track. If the Earcon is not delivered within the same ISO BMFF file, this value SHALL be set to zero.

For an easy identification of the Earcon(s) track on MPD level, the following Attribute/Element can be used EarconComponent@tag:

Summary of relevant MPD elements and attributes for MPEG-H Audio

| Element or Attribute Name | Description |
|---|---|
| ContentComponent@tag | This field indicates the mae_groupID as defined in ISO/IEC 23008-3 [3DA] which is contained in the Media Content Component. |
| EarconComponent@tag | This field indicates the Earcon_id as defined in ISO/IEC 23008-3 [3DA] which is contained in the Media Content Component. |

For MPEG-H Audio this can be implemented, in examples, by making use of the MHAS packets:
- a new MHAS packet for caring information about Earcons can be defined: PACTYP_EARCON carrying the EarconInfo( ) structure;
- a new identification field in a generic MHAS METADATA MHAS packet, for carrying the EarconInfo( ) structure.

With respect to the metadata, the metadata processor 132 may have at least some of the following capabilities:
extract Audio information message metadata from a Stream;

modify Audio information message metadata to activate the Audio information message and/or set/change its position and/or write/modify and Audio information message text label;
embed metadata back in a Stream;
feed the Stream to an additional media decoder;
extract Audio metadata from the least one first Audio Stream (116);
extract Audio information message metadata from an additional Stream;
modify Audio information message metadata to activate the Audio information message and/or set/change its position and/or write/modify and Audio information message text label;
modify Audio metadata of the least one first Audio Stream (116) so as to take into consideration the existence of the Audio information message and allow merging;
feed a Stream to the multiplexer or muxer to multiplex or mux them based on the information received from the ROI processor.

Figure 3:
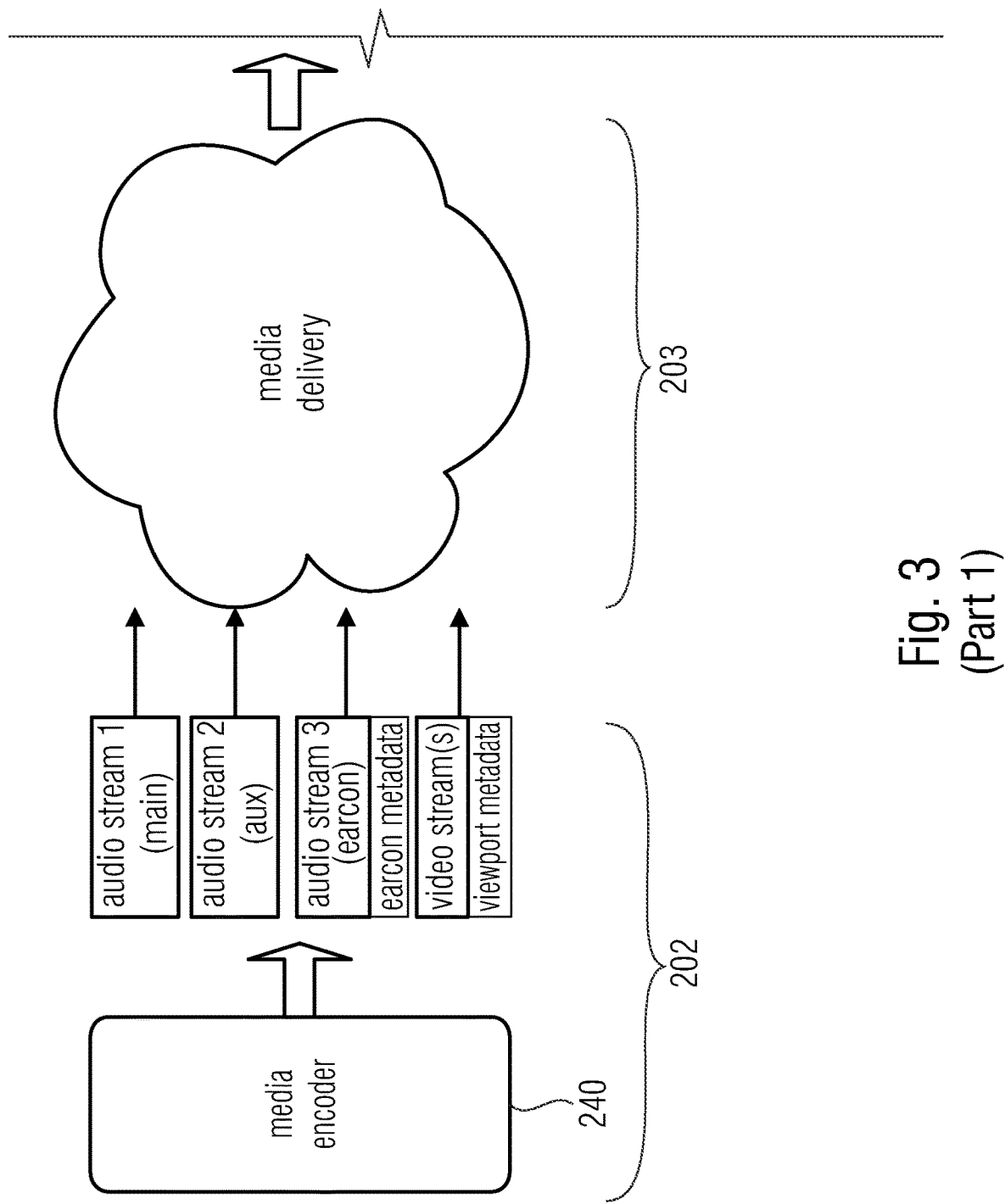

6.4 Example of FIG. 3

FIG. 3 shows a system 300 comprising, at the client side 204, a system 302 (client system) which may embody, for example, the system 100 or 200.

The system 302 may comprise the ROI processor 120, the metadata processor 132, a decoder group 313 formed by a plurality of decoders 112.

In this example, different Audio Streams are decoded (each at by a respective media Audio decoder 112) and are subsequently mixed together and/or rendered together to provide the final Audio scene.

The at least one Audio Stream is here represented as comprising two Streams 116 and 316 (other examples may provide one single Stream, as in FIG. 2, or more than two Streams). These are the Audio Streams that are meant at reproducing the Audio scene that the user is expected to experience. Here, reference is made to Earcons, even it is possible to generalize the concept to any Audio information messages.

Additionally, an Earcon Stream 140 may be provided by the media encoder 240. On the basis of the user's movements and of the ROIs as indicated in the viewport metadata 131 and/or other criteria, the ROI processor will cause the reproduction of an Earcon from the Earcon Stream 140 (also indicated as additional Audio Stream as being in addition to the Audio Streams 116 and 316).

Notably, the actual representation of the Earcon will be based on the Earcon metadata 141 and on the modifications performed by the metadata processor 132.

In examples, the Stream may be requested by the system 302 (client) to the media encoder 240 (server) in case of necessity. For example, the ROI processor may decide that, on the basis of the user's movements, a particular Earcon will be soon needed and, therefore, may request an appropriate Earcon Stream 140 to the media encoder 240.

It is possible to note the following aspects of this example:
Use case: The Audio data is delivered in one or more Audio Streams 116, 316 (e.g., one main Stream and an auxiliary Stream) while the Earcon(s) are delivered in one or more additional Streams 140 (dependent or independent of the main Audio Stream)
In one implementation on the Client side 204 the ROI Processor 120 and the Metadata Processor 132 are used for efficiently process the Earcon information The ROI Processor 120 may receive information 122 about the current viewport (user orientation information) from the media consumption device side 206 used for content consumption (e.g., based on a HMD). The ROI Processor may also receive information about and the ROI signalled in the Metadata (Video Viewports are signalled as in OMAF).
Based on this information, the ROI Processor 120 can decide to activate one (or more) Earcons contained in the Earcon Audio Stream 140. Additionally, the ROI Processor 120 can decide on a different location of the Earcons and different gain values (e.g., for a more accurate representation of the Earcon in the current space that the content is consumed).
The ROI Processor 120 provides this information to the Metadata Processor 132.
The Metadata Processor 132 may parse the metadata contained in the Earcon Audio Stream and
enables the Earcon (so as to permit its reproduction) and, if requested by the ROI Processor 120, modifies the spatial position and gain information contained in the Earcon metadata 141 accordingly.
Each Audio Stream 116, 316, 140 is then decoded and rendered (based on the user position information) independently and the output of all media Decoders is Mixed together as a final step by the mixer or renderer 314. A different implementation can only decode the compressed Audio and provide the decoded Audio data and the metadata to a General Common renderer for the final rendering of all Audio elements (including the Earcons).
Additionally, in a Streaming environment, based on the same information, the ROI Processor 120 can decide to request the Earcon(s) Stream(s) 140 in advance (e.g., when the user looks into the wrong direction with few seconds before the ROI is enabled.

Figure 4:
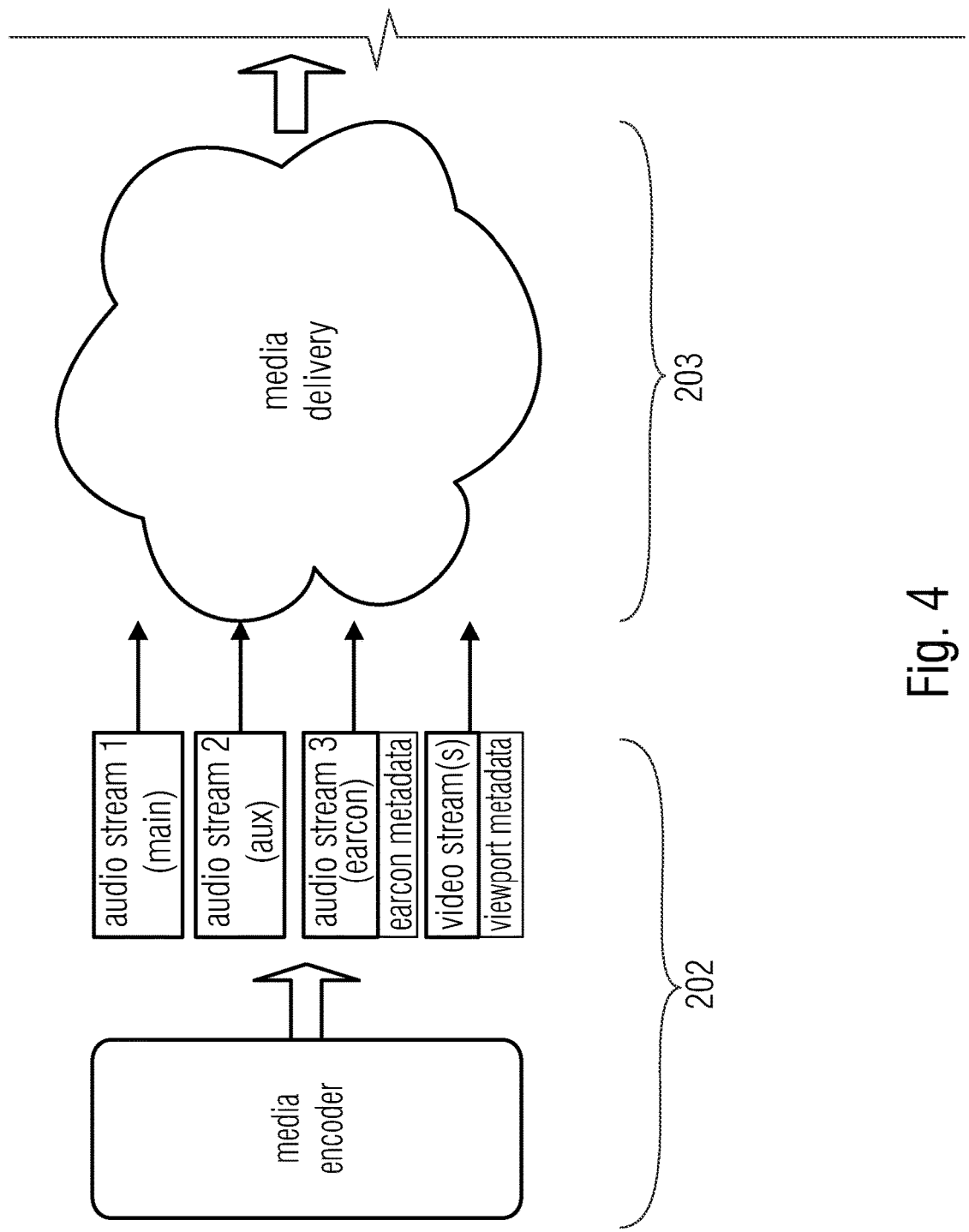
Figure 4:
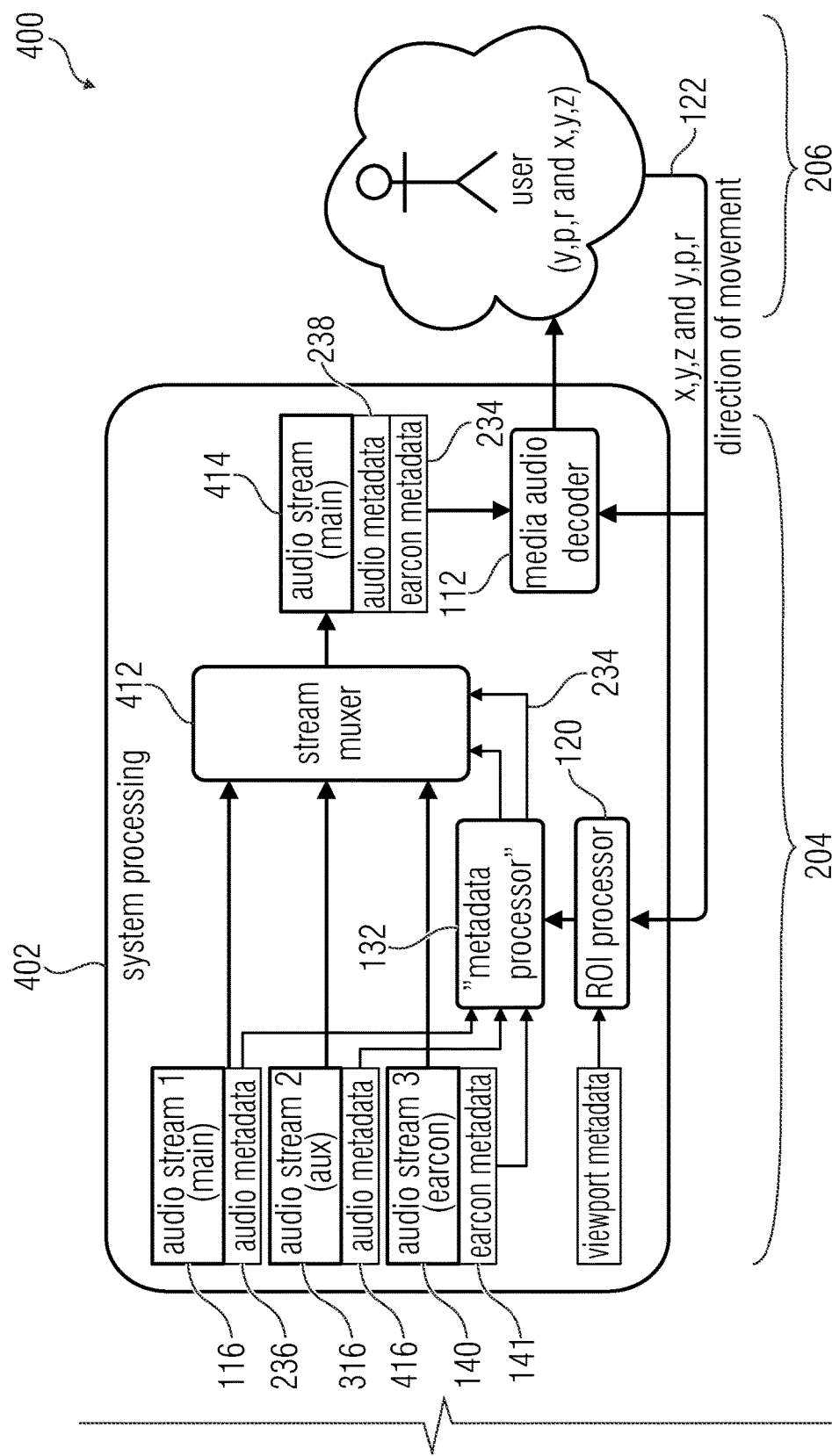

6.5 Example of FIG. 4

FIG. 4 shows a system 400 comprising, at the client side 204, a system 402 (client system) which may embody, for example, the system 100 or 200. Here, reference is made to Earcons, even it is possible to generalize the concept to any Audio information messages.

The system 402 may comprise the ROI processor 120, the metadata processor 132, a Stream multiplexer or muxer 412. In the examples in which the multiplexer or muxer 412, the number of operations to be performed by the hardware are advantageously reduced with respect to the number of operations to be performed when multiple decoders and one mixer or renderer are used.

In this example, different Audio Streams are processed, on the basis of their metadata and multiplexed or muxer at the element 412.

The at least one Audio Stream is here represented as comprising two Streams 116 and 316 (other examples may provide one single Stream, as in FIG. 2, or more than two Streams). These are the Audio Streams that are meant at reproducing the Audio scene that the user is expected to experience.

Additionally, an Earcon Stream 140 may be provided by the media encoder 240. On the basis of the user's movements and of the ROIs as indicated in the viewport metadata 131 and/or other criteria, the ROI processor 120 will cause the reproduction of an Earcon from the Earcon Stream 140 (also indicated as additional Audio Stream as being in addition to the Audio Streams 116 and 316).

Each Audio Stream 116, 316, 140 may include metadata 236, 416, 141, respectively. At least some of these metadata may be manipulated and/or processed to be provided to the Stream muxer or multiplexer 412 in which the packets of the Audio Streams are merged together. Accordingly, the Earcon may be represented as a part of the Audio scene.

The Stream muxer or multiplexer 412 may therefore provide an Audio Stream 414 with comprises modified Audio metadata 238 and modified Earcon metadata 234, which may be provided to an Audio decoder 112 and decoded and reproduced to the user.

It is possible to note the following aspects of this example:
Use case: The Audio data is delivered in one or more Audio Streams 116, 316 (e.g., one main Stream 116 and an auxiliary Stream 316, but also one single Audio Stream may be provided) while the Earcon(s) are delivered in one or more additional Streams 140 (dependent or independent of the main Audio Stream 116)
In one implementation on the Client side 204 the ROI Processor 120 and the Metadata Processor 132 are used for efficiently process the Earcon information
The ROI Processor 120 may receive information 122 about the current viewport (user orientation information) from the media consumption device used for content consumption (e.g., a HMD). The ROI Processor 120 may also receive information about and the ROI signalled in the Earcon metadata 141 (Video Viewports may be signalled as in Omnidirectional Media Application Format, OMAF).
Based on this information, the ROI Processor 120 can decide to activate one (or more) Earcons contained in the additional Audio Stream 140. Additionally, the ROI Processor 120 can decide on a different location of the Earcons and different gain values (e.g., for a more accurate representation of the Earcon in the current space that the content is consumed).
The ROI Processor 120 may provide this information to the Metadata Processor 132.
The Metadata Processor 132 may parse the metadata contained in the Earcon Audio Stream and enables the Earcon
and, if requested by the ROI Processor, modifies the spatial position and/or gain information and/or text labels contained in the Earcon metadata accordingly.
The Metadata Processor 132 may parse also the Audio Metadata 236, 416 of all Audio Streams 116, 316 and manipulate the Audio Specific Information in such a way that the Earcon can be used as part of the Audio scene (e.g., if the Audio scene has a 5.1 channel bed and 4 objects, the Earcon Audio element is added to the scene as the fifth object. All metadata fields are updated accordingly).
The Audio data of each Stream 116, 316 and the modified Audio Metadata and Earcon Metadata are then provided to a Stream Muxer or multiplexer which can generate based on this, one Audio Stream 414 with one set of Metadata (modified Audio metadata 238 and modified Earcon metadata 234).
This Stream 414 may be decoded by a single Media Audio Decoder 112 based on the user position information 122.
Additionally, in a Streaming environment, based on the same information, the ROI Processor 120 can decide to request the Earcon(s) Stream(s) 140 in advance (e.g., when the user looks into the wrong direction with few seconds before the ROI is enabled).

Figure 5A:
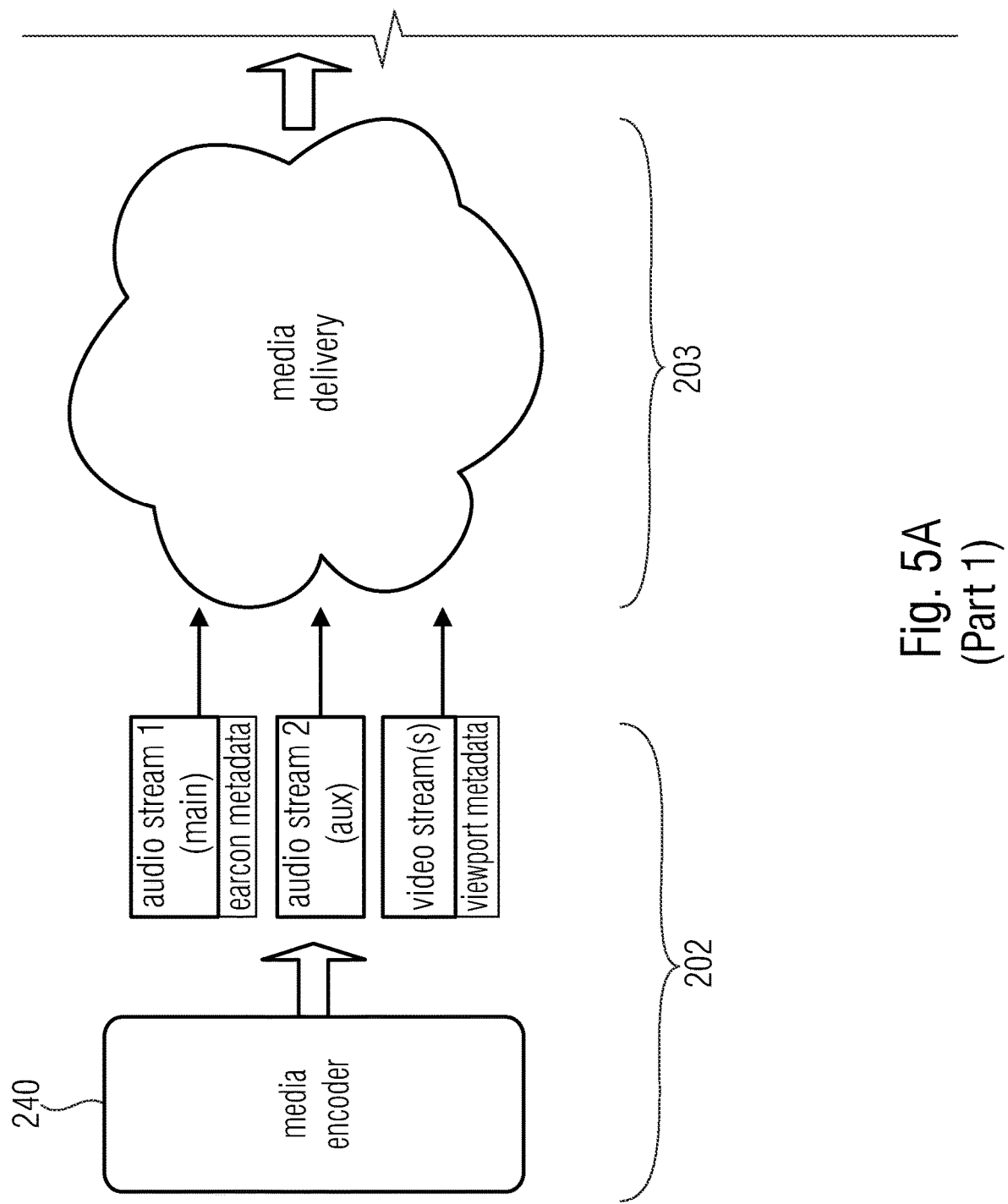
Figure 5A:
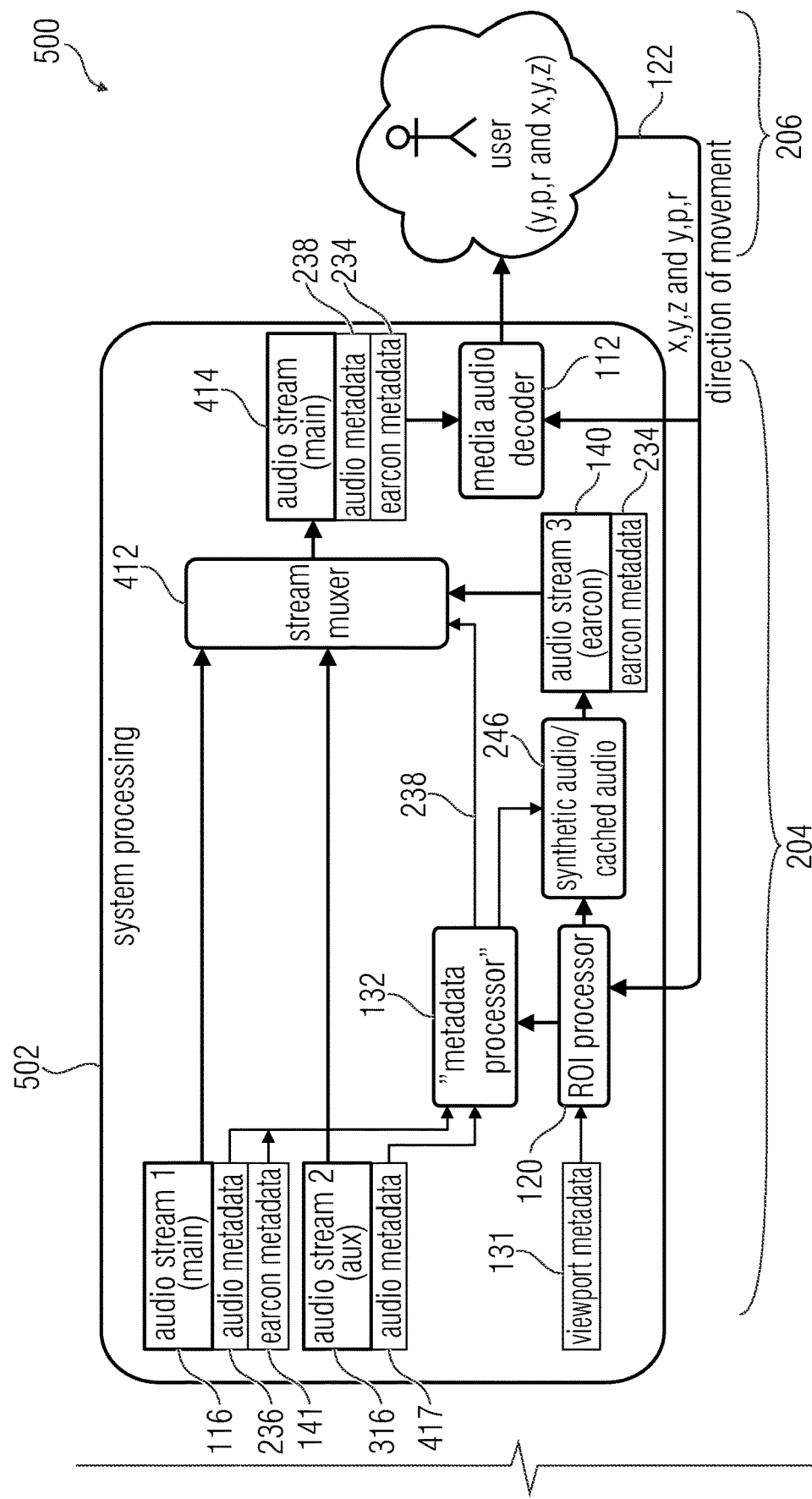

6.6 Example of FIG. 5A

FIG. 5A shows a system 500 comprising, at the client side 204, a system 502 (client system) which may embody, for example, the system 100 or 200. Here, reference is made to Earcons, even it is possible to generalize the concept to any Audio information messages.

The system 502 may comprise the ROI processor 120, the metadata processor 132, a Stream multiplexer or muxer 412.

In this example, an Earcon Stream is not provided by a remote entity (at the client side), but is generated by the synthetic Audio generator 246 (which may also have the capability of storing a Stream, for re-using subsequently, or to use a stored compress/uncompressed version of a natural sound). The Earcon metadata 141 are notwithstanding provided by the remote entity, e.g., in an Audio Stream 116 (which is not an Earcon Stream). Therefore, the synthetic Audio generator 246 may be activated to create an Audio Stream 140 on the basis of the attributes of the Earcon metadata 141. For example, the attributes may refer to a type of the synthesized voice (natural sound, synthetic sound, spoken text, and so on) and/or text labels (the Earcon can be generated by creating synthetic sound based on the text in the metadata). In examples, after that the Earcon Stream has been created, the same may be stored for being re-used in the future. Alternatively, the synthetic sound can be a generic sound stored permanently in the device.

A Stream muxer or multiplexer 412 may be used to merge packets of the Audio Stream 116 (and in case also of other Streams, such as the auxiliary Audio Stream 316) with the packets of the Earcon Stream generated by the generator 246. After that, an Audio Stream 414 may be obtained which is associated to modified Audio metadata 238 and modified Earcon metadata 234. The Audio Stream 414 may be decoded by the decoder 112 and reproduced to the user at the media consumption device side 206.

It is possible to note the following aspects of this example:
Use case:
The Audio data is delivered in one or more Audio Streams (e.g., one main Stream and an auxiliary Stream)
No Earcon(s) are delivered from the remote device, but the Earcon Metadata 141 is delivered as part of the main Audio Stream (specific signaling may be used for indicating that the Earcon has no Audio data associated with)
In one implementation on the Client side the ROI Processor 120 and the Metadata Processor 132 are used for efficiently process the Earcon information
The ROI Processor 120 may receive information about the current viewport (user orientation information) from the device used at the content consumption device side 206 (e.g., a HMD). The ROI Processor 120 may also receive information about and the ROI signalled in the Metadata (Video Viewports are signalled as in OMAF).
Based on this information, the ROI Processor 120 can decide to activate one (or more) Earcon(s) NOT present in the Stream 116. Additionally, the ROI Processor 120 can decide on a different location of the Earcons and different gain values (e.g., for a more accurate representation of the Earcon in the current space that the content is consumed).

The ROI Processor 120 may provide this information to the Metadata Processor 132.

The Metadata Processor 120 may parse the metadata contained in the Audio Stream 116 and may enable an Earcon and, if requested by the ROI Processor 120, modify the spatial position and gain information contained in the Earcon metadata 141 accordingly.

The Metadata Processor 132 may parse also the Audio Metadata (e.g., 236, 417) of all Audio Streams (116, 316) and manipulate the Audio Specific Information in such a way that the Earcon can be used as part of the Audio scene (e.g., if the Audio scene has a 5.1 channel bed and 4 objects, the Earcon Audio element is added to the scene as the fifth object. All metadata fields are updated accordingly).

The modified Earcon Metadata and the information from the ROI Processor 120 are provided to the Synthetic Audio Generator 246. The Synthetic Audio Generator 246 may create based on the information received a synthetic sound (e.g., based on the spatial position of the Earcon a voice signal is generated spelling the location). Also, the Earcon Metadata 141 is associated with the generated Audio data into a new Stream 414.

Similarly, as before, the Audio data of each Stream (116, 316) and the modified Audio Metadata and Earcon Metadata are then provided to a Stream Muxer which can generate based on this one Audio Stream with one set of Metadata (Audio and Earcon).

This Stream 414 is decoded by a single Media Audio Decoder 112 based on the user position information Alternatively or additionally, the Audio Data of the Earcon can be cached in the Client (e.g., from previous Earcon usages)

Alternatively, the output of Synthetic Audio Generator 246 can be uncompressed Audio and it can be mixed into the final rendered scene Additionally, in a Streaming environment, based on the same information, the ROI Processor 120 can decide to request the Earcon(s) Stream(s) in advance (e.g., when the user looks into the wrong direction with few seconds before the ROI is enabled).

Figure 6:
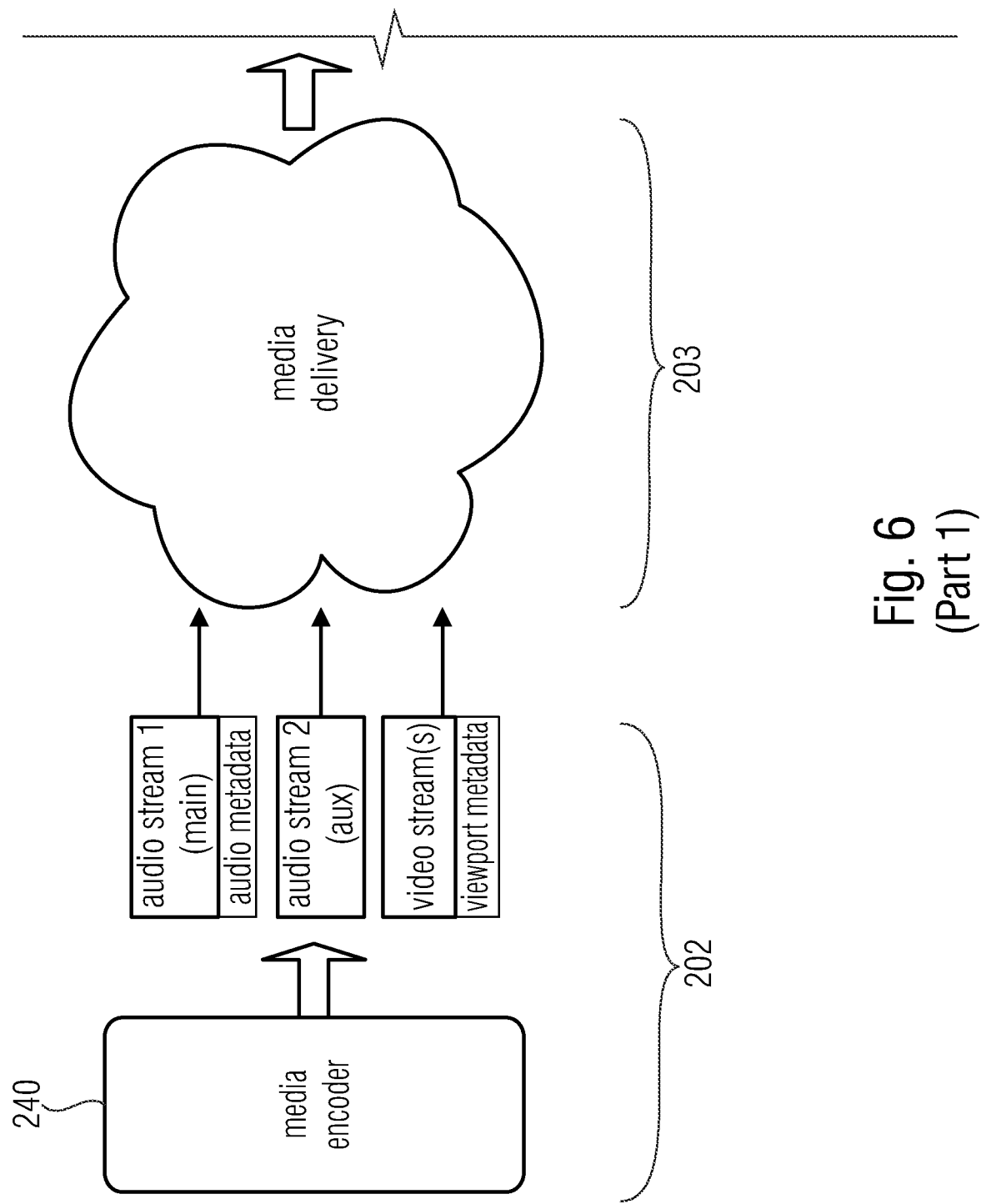
Figure 6:
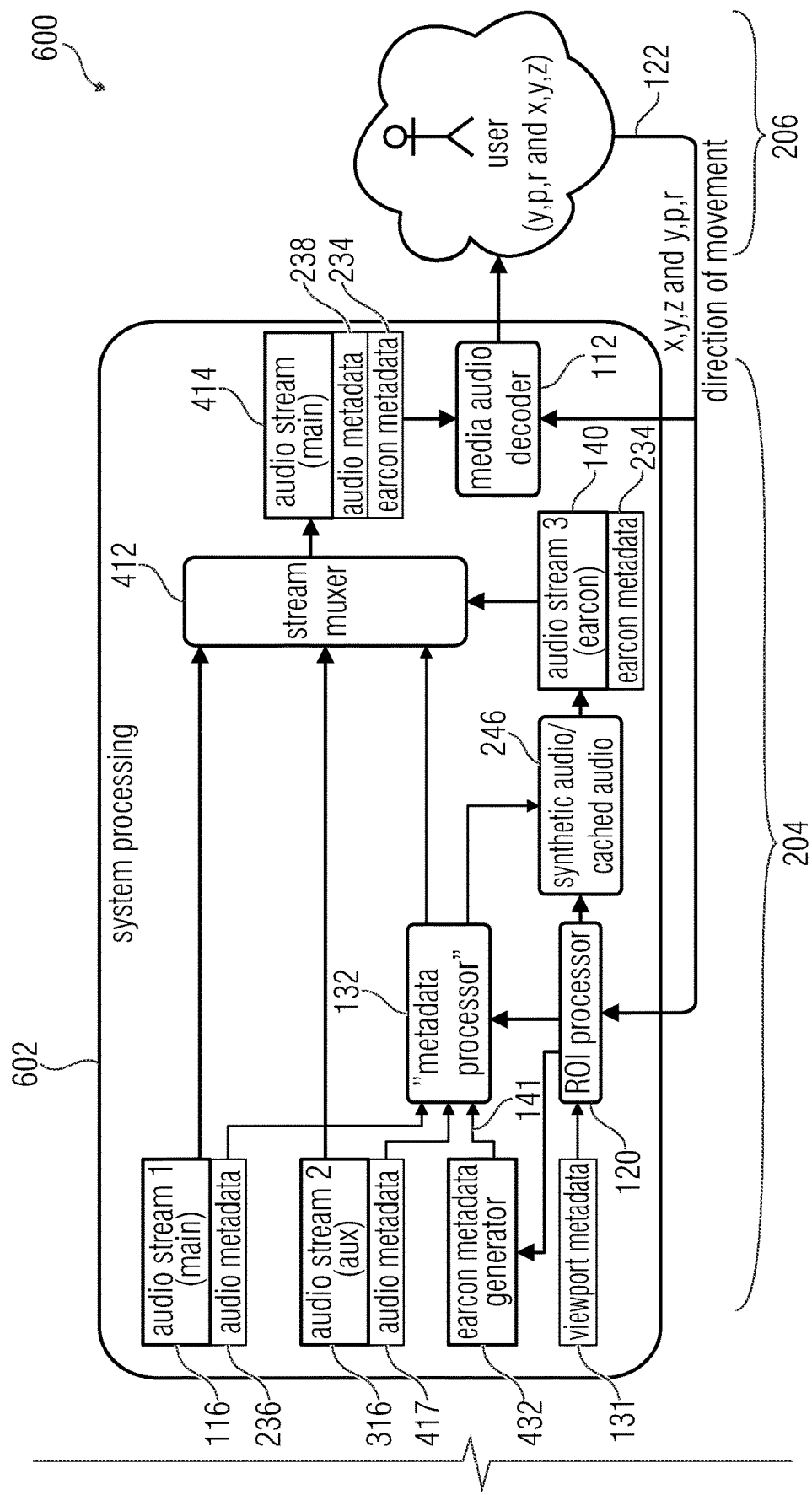
Figure 7:
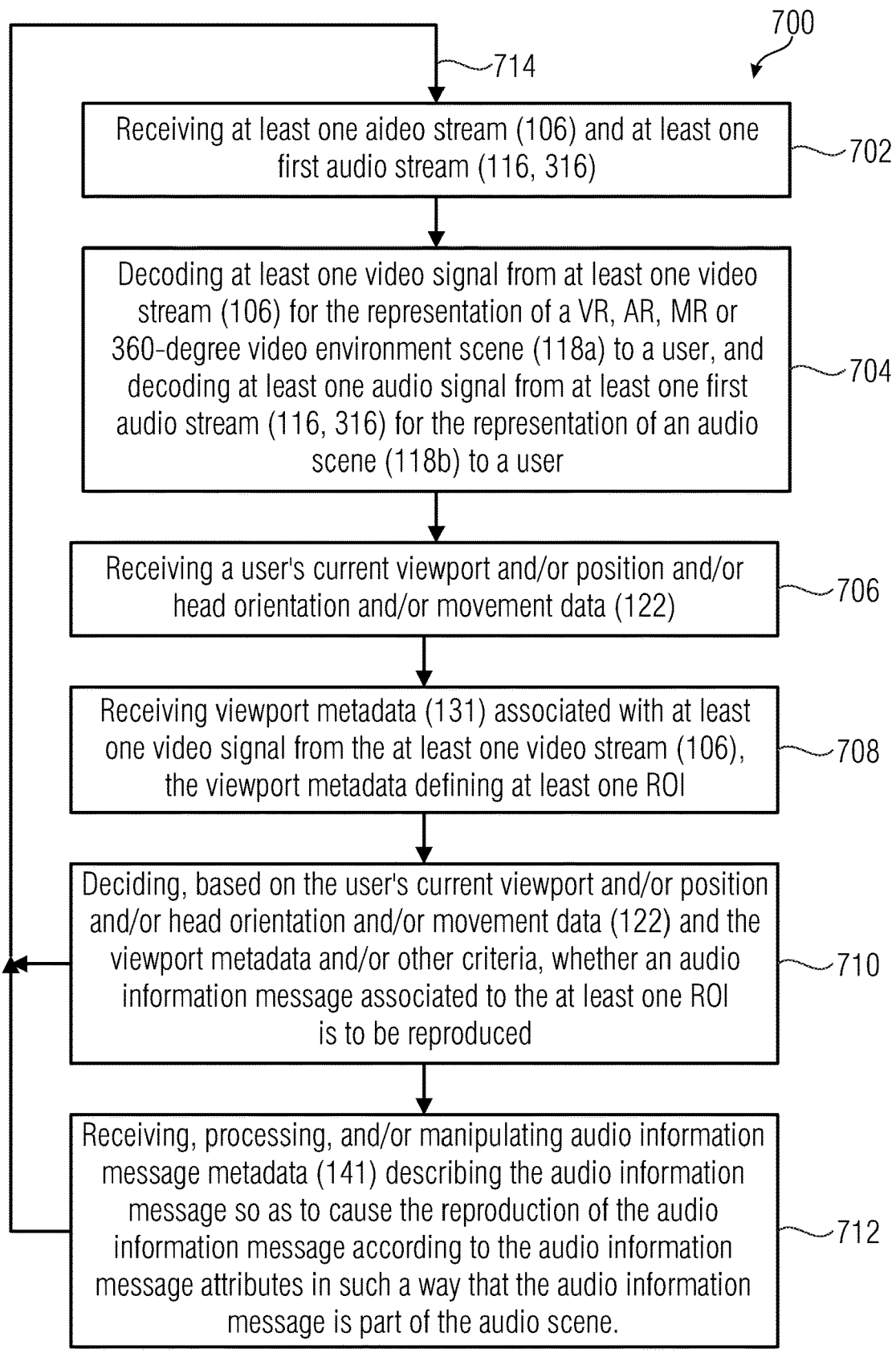
FIG. 7 shows a method according to an example.

6.7 Example of FIG. 6

FIG. 6 shows a system 600 comprising, at the client side 204, a system 602 (client system) which may embody, for example, the system 100 or 200. Here, reference is made to Earcons, even it is possible to generalize the concept to any Audio information messages.

The system 602 may comprise the ROI processor 120, the metadata processor 132, a Stream multiplexer or muxer 412.

In this example, an Earcon Stream is not provided by a remote entity (at the client side), but is generated by the synthetic Audio generator 236 (which may also have the capability of storing a Stream, for re-using subsequently).

In this example, the Earcon metadata 141 are not provided by the remote entity. The Earcon metadata are generated by a metadata generator 432 which may generate Earcon metadata to be used (e.g., processed, manipulated, modified) by the metadata processor 132. The Earcon metadata 141 generated by the Earcon metadata generator 432 may have the same structure and/or format and/or attribute than the Earcon metadata discussed for the previous examples.

The metadata processor 132 may operate as in the example of FIG. 5A. A synthetic Audio generator 246 may be activated to create an Audio Stream 140 on the basis of the attributes of the Earcon metadata 141. For example, the attributes may refer to a type of the synthesized voice (natural sound, synthetic sound, spoken text, and so on), and/or to the gain, and/or to the activation/non-activation state, and so on. In examples, after that the Earcon Stream 140 has been created, the same may be stored (e.g., cached) for being re-used in the future. It is also possible to store (e.g., cache) the Earcon metadata generated by the Earcon metadata generator 432.

A Stream muxer or multiplexer 412 may be used to merge packets of the Audio Stream 116 (and in case also of other Streams, such as the auxiliary Audio Stream 316) with the packets of the Earcon Stream generated by the generator 246. After that, an Audio Stream 414 may be obtained which is associated to modified Audio metadata 238 and modified Earcon metadata 234. The Audio Stream 414 may be decoded by the decoder 112 and reproduced to the user at the media consumption device side 206.

It is possible to note the following aspects of this example:
Use case:
The Audio data is delivered in one or more Audio Streams (e.g., one main Stream 116 and an auxiliary Stream 316)
No Earcon(s) are delivered from the client side 202,
No Earcon Metadata is delivered from the client side 202
This use case can represent a solution for enabling Earcons for legacy content which was created without Earcons In one implementation on the Client side the ROI Processor 120 and the Metadata Processor 232 are used for efficiently process the Earcon information The ROI Processor 120 may receive information 122 about the current viewport (user orientation information) from the device used at the content consumption device side 206 (e.g., a HMD). The ROI Processor 210 may also receive information about and the ROI signalled in the Metadata (Video Viewports are signalled as in OMAF).

Based on this information, the ROI Processor 120 can decide to activate one (or more) Earcon(s) NOT present in the Stream (116, 316).

Additionally, the ROI Processor 120 may provide information about the location of the Earcons and gain values to the Earcon Metadata Generator 432.

The ROI Processor 120 may provide this information to the Metadata Processor 232.

The Metadata Processor 232 may parse the metadata contained in an Earcon Audio Stream (if present) and may:
enable the Earcon
and, if requested by the ROI Processor 120, modify the spatial position and gain information contained in the Earcon metadata accordingly.

The Metadata Processor may also parse also the Audio Metadata 236, 417 of all Audio Streams 116, 316 and manipulate the Audio Specific Information in such a way that the Earcon can be used as part of the Audio scene (e.g., if the Audio scene has a 5.1 channel bed and 4 objects, the Earcon Audio element is added to the scene as the fifth object. All metadata fields are updated accordingly).

The modified Earcon Metadata 234 and the information from the ROI Processor 120 are provided to the Synthetic Audio Generator 246. The Synthetic Audio Generator 246 may create based on the information received a synthetic sound (e.g., based on the spatial position of the Earcon a voice signal is generated spelling the location). Also the Earcon Metadata is associated with the generated Audio data into a new Stream Similarly, as before, The Audio data of each Stream and the modified Audio Metadata and Earcon Metadata are then provided to a Stream Muxer or multiplexer 412 which can generate based on this one Audio Stream 414 with one set of Metadata (Audio and Earcon).

This Stream 414 is decoded by a single Media Audio Decoder based on the user position information Alternatively, the Audio Data of the Earcon can be cashed in the Client (e.g., from previous Earcon usages)

Alternatively, the output of Synthetic Audio Generator can be uncompressed Audio and it can be mixed into the final rendered scene Additionally, in a Streaming environment, based on the same information, the ROI Processor 120 can decide to request the Earcon(s) Stream(s) in advance (e.g., when the user looks into the wrong direction with few seconds before the ROI is enabled)

6.8 Example Based on the Position of the User

It is possible to implement a function which permits to reproduce an Earcon only when a user does not see the ROI.

The ROI processor 120 may periodically check, for example, the user's current viewport and/or position and/or head orientation and/or movement data 122. If the ROI is visible to the user, no reproduction of the Earcon is caused.

If, from the user's current viewport and/or position and/or head orientation and/or movement data, the ROI processor determines that the ROI is not visible to the user, the ROI processor 120 may request a reproduction of the Earcon. In this case, the ROI processor 120 may cause the metadata processor 132 to prepare the reproduction of the Earcon. The metadata processor 132 may use one of the techniques described for the examples above. For example the metadata may be retrieved in a Stream delivered by the server side 202, may be generated by the Earcon metadata generator 432, and so on. The attributes of the Earcon metadata may be easily modified on the basis of the ROI processor's requests and/or various conditions. For example, if a user's selection has previously disabled the Earcon, the Earcon will not be reproduced, even if the user does not see the ROI. For example, if a (previously set) timer has not expired yet, the Earcon will not be reproduced, even if the user does not see the ROI.

Additionally, if from the user's current viewport and/or position and/or head orientation and/or movement data, the ROI processor determines that the ROI is visible to the user, the ROI processor 120 may request that no reproduction of the Earcon is done, especially if the Earcon metadata already contains signalling for an active Earcon.

In this case, the ROI processor 120 may cause the metadata processor 132 to disable the reproduction of the Earcon. The metadata processor 132 may use one of the techniques described for the examples above. For example, the metadata may be retrieved in a Stream delivered by the server side 202, may be generated by the Earcon metadata generator 432, and so on. The attributes of the Earcon metadata may be easily modified on the basis of the ROI processor's requests and/or various conditions. If the metadata already contains the indication that an Earcon should be reproduced, the metadata is modified, in this case, to indicate that the Earcon is inactive and it should not be reproduced.

It is possible to note the following aspects of this example:

Use case:
- The Audio data is delivered in one or more Audio Streams 116, 316 (e.g., one main Stream and an auxiliary Stream) while the Earcon(s) are delivered either in the same one or more Audio Streams 116, 316 or in one or more additional Streams 140 (dependent or independent of the main Audio Stream)
- The Earcon metadata is set in such a way that it indicates the Earcon to be active at specific moments in time.
- A first generation of devices that is not including an ROI processor would read the Earcon metadata and cause the reproduction of the Earcon independently of the fact that the user's current viewport and/or position and/or head orientation and/or movement data indicates that the ROI is visible to the user
- A newer generation of devices that includes an ROI processor as described in any of the systems, would make use of the ROI Processor determination. If from the user's current viewport and/or position and/or head orientation and/or movement data, the ROI processor determines that the ROI is visible to the user, the ROI processor 120 may request that no reproduction of the Earcon is done, especially if the Earcon metadata already contains signalling for an active Earcon. In this case, the ROI processor 120 may cause the metadata processor 132 to disable the reproduction of the Earcon. The metadata processor 132 may use one of the techniques described for the examples above. For example, the metadata may be retrieved in a Stream delivered by the server side 202, may be generated by the Earcon metadata generator 432, and so on. The attributes of the Earcon metadata may be easily modified on the basis of the ROI processor's requests and/or various conditions. If the metadata already contains the indication that an Earcon should be reproduced, the metadata is modified, in this case, to indicate that the Earcon is inactive and it should not be reproduced.
- Additionally, depending on the playback device, the ROI Processor may decide to request the modification of the Earcon metadata. For example, the Earcon spatial information can be modified differently if the sound is reproduced over headphones or over loudspeakers.

Therefore, the final Audio scene experienced by the user will be obtained on the basis of the metadata modifications performed by the metadata processor.

6.9 Example Based on the Server Client Communication (FIG. 5B)

FIG. 5B shows a system 550 comprising, at the client side 204, a system 552 (client system) which may embody, for example, the system 100 or 200 or 300 or 400 or 500. Here, reference is made to Earcons, even it is possible to generalize the concept to any Audio information messages.

The system 552 may comprise the ROI processor 120, the metadata processor 132, a Stream multiplexer or muxer 412. (In examples, different Audio Streams are decoded (each at by a respective media Audio decoder 112) and are subsequently mixed together and/or rendered together to provide the final Audio scene).

The at least one Audio Stream is here represented as comprising two Streams 116 and 316 (other examples may provide one single Stream, as in FIG. 2, or more than two Streams). These are the Audio Streams that are meant at reproducing the Audio scene that the user is expected to experience.

Additionally, an Earcon Stream 140 may be provided by the media encoder 240.

The Audio Streams may be encoded at different bitrates, that allow efficient bitrate adaptation depending on the network connection (i.e., for users using high speed connection the high bitrate coded version is delivered while for users with lower speed network connection a lower bitrate version is delivered).

The Audio Streams may be stored on a Media Server 554, where for each Audio Stream the different encodings at different bitrates are grouped in one Adaptation Set 556 with the appropriate data signalling the availability of all the created Adaptation Sets. Audio adaptation sets 556 and Video adaptation sets 557 may be provided.

On the basis of the user's movements and of the ROIs as indicated in the viewport metadata 131 and/or other criteria, the ROI processor 120 will cause the reproduction of an Earcon from the Earcon Stream 140 (also indicated as additional Audio Stream as being in addition to the Audio Streams 116 and 316).

In this example:
the client 552 is configured to receive, from the server, data about availability of all the Adaptation Sets, the available Adaptation Sets including:
at least one Audio scene Adaptation Set for the at least one Audio Stream; and
at least one Audio message Adaptation Set for the at least one additional Audio Stream containing at least one Audio information message
Similar to the other example implementations, the ROI Processor 120 may receive information 122 about the current viewport (user orientation information) from the media consumption device side 206 used for content consumption (e.g., based on a HMD). The ROI Processor 120 may also receive information about and the ROI signalled in the Metadata (Video Viewports are signalled as in OMAF).
Based on this information, the ROI Processor 120 can decide to activate one (or more) Earcons contained in the Earcon Audio Stream 140.
Additionally, the ROI Processor 120 can decide on a different location of the Earcons and different gain values (e.g., for a more accurate representation of the Earcon in the current space that the content is consumed).
The ROI Processor 120 may provide this information to a Selection Data Generator 558.
a Selection data generator 558 may be configured to create, based on the ROI processor's decision, selection data 559 identifying which of the Adaptation Sets are to be received; the Adaptation Sets including the Audio scene Adaptation Sets and the Audio message Adaptation Sets
the Media Server 554 may be configured to provide instruction data to the client 552 to cause the Streaming client to retrieve the data for the Adaptation Sets 556, 557 identified by the selection data identifying which of the Adaptation Sets are to be received; the Adaptation Sets including the Audio scene Adaptation Sets and the Audio message Adaptation Sets a Download and Switching module 560 is configured to receive the requested Audio Streams from the Media Server 554 based on the selection data identifying which of the Adaptation Sets are to be received; the Adaptation Sets including the Audio scene Adaptation Sets and the Audio message Adaptation Sets. The Download and Switching module 560 may be additionally configured to provide the Audio metadata and the Earcon metadata 141 to the Metadata Processor 132.

The ROI Processor 120 may provide this information to the Metadata Processor 132.

The Metadata Processor 132 may parse the metadata contained in the Earcon Audio Stream 140 and
enable the Earcon (so as to permit its reproduction)
and, if requested by the ROI Processor 120, modify the spatial position and gain information contained in the Earcon metadata 141 accordingly.

The Metadata Processor 132 may parse also the Audio Metadata of all Audio Streams 116, 316 and manipulate the Audio Specific Information in such a way that the Earcon can be used as part of the Audio scene (e.g., if the Audio scene has a 5.1 channel bed and 4 objects, the Earcon Audio element is added to the scene as the fifth object. All metadata fields may be updated accordingly).

The Audio data of each Stream 116, 316 and the modified Audio Metadata and Earcon Metadata may then be provided to a Stream Muxer or multiplexer which can generate based on this, one Audio Stream 414 with one set of Metadata (modified Audio metadata 238 and modified Earcon metadata 234).

This Stream may be decoded by a single Media Audio Decoder 112 based on the user position information 122.

An Adaptation Set may be formed by a set of Representations containing interchangeable versions of the respective content, e.g., different audio bitrates (e.g., different streams at different bitrates). Although one single Representation could be theoretically enough to provide a playable stream, multiple Representations may give the client the possibility to adapt the media stream to its current network conditions and bandwidth requirements and therefore guarantee smoother playback.

6.10 Method

All the examples above may be implemented by method steps. Here, a method 700 (which may be performed by any of the examples above) is described for completeness. The method may comprise:
At step 702, receiving at least one Video Stream (106) and at least one first Audio Stream (116, 316),
At step 704, decoding at least one Video signal from at least one Video Stream (106) for the representation of a VR, AR, MR or 360-degree Video environment scene (118*a*) to a user; and
At step 706, decoding at least one Audio signal from at least one first Audio Stream (116, 316) for the representation of an Audio scene (118*b*) to a user;
receive a user's current viewport and/or position and/or head orientation and/or movement data (122); and At step 708, receiving viewport metadata (131) associated with at least one Video signal from the at least one Video Stream (106), the viewport metadata defining at least one ROI; and At step 710, deciding, based on the user's current viewport and/or position and/or head orientation and/or movement data (122) and the viewport metadata and/or other criteria, whether an Audio information message associated to the at least one ROI is to be reproduced; and At step 712, receiving, processing, and/or manipulating Audio information message metadata (141) describing the Audio information message so as to cause the reproduction of the Audio information message according to the Audio information message attributes in such a way that the Audio information message is part of the Audio scene.

Notably, the sequence may also vary. For example, the receiving steps 702, 706, 708 may have different order, according to the actual order in which the information is delivered.

Line 714 refers to the fact that the method may be reiterated. Step 712 may be skipped in case of ROI processor's decision of non-reproducing the Audio information message.

6.11 Other Implementations

Figure 8:
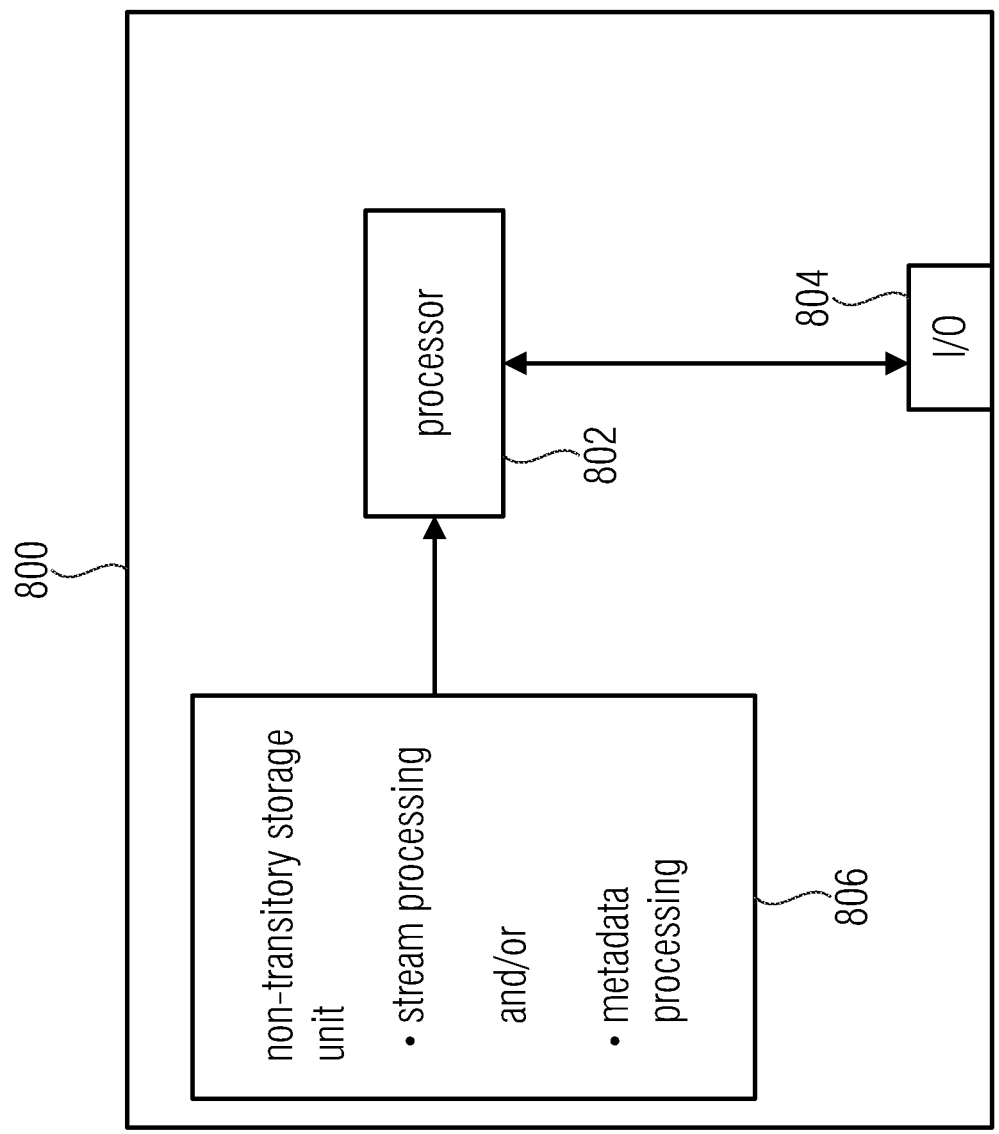
FIG. 8 shows an example of an implementation.

FIG. 8 shows a system 800 which may implement one of the system (or a component thereof) or perform the method 700. The system 800 may comprise a processor 802 and a non-transitory memory unit 806 storing instructions which, when executed by the processor 802, may cause the processor to perform at least the Stream processing operations discussed above and/or the metadata processing operations discussed above. The system 800 may comprise an input/output unit 804 for the connection with external devices.

The system 800 may implement at least some of (or all) the functions of the ROI processor 120, the metadata processor 232, the generator 246 the muxer or multiplexer 412, the decoder 112*m* the Earcon metadata generator 432, and so on.

Depending on certain implementation requirements, examples may be implemented in hardware. The implementation may be performed using a digital storage medium, for example a floppy disk, a Digital Versatile Disc (DVD), a Blu-Ray Disc, a Compact Disc (CD), a Read-only Memory (ROM), a Programmable Read-only Memory (PROM), an Erasable and Programmable Read-only Memory (EPROM), an Electrically Erasable Programmable Read-Only Memory (EEPROM) or a flash memory, having electronically readable control signals stored thereon, which cooperate (or are capable of cooperating) with a programmable computer system such that the respective method is performed. Therefore, the digital storage medium may be computer readable.

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine readable carrier. In other words, an example of method is, therefore, a computer program having a program instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non—transitionary, rather than signals which are intangible and transitory.

A further example comprises a processing unit, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A content consumption device system configured to receive at least one first Audio Stream associated with a scene to be reproduced,
    wherein the content consumption device system comprises:
    at least one media Audio decoder configured to decode at least one Audio signal from the at least one first Audio Stream for the representation of the scene to a user;
    a first processor configured to:
        decide, based at least on user's movement data and/or user's selection and/or metadata, whether an Earcon is to be reproduced, wherein the Earcon is independent of the at least one Audio signal; and
        cause, at the decision that the Earcon is to be reproduced, the reproduction of the Earcon,
    wherein the content consumption device system is configured to generate and/or modify Earcon metadata; and
    wherein the content consumption device system further comprises an Audio generator configured to generate at least one additional Stream, in which the Earcon is encoded, based on the Earcon metadata.

2. The content consumption device system of claim 1, wherein the Audio generator stores a previously generated additional Stream in which the Earcon is encoded.

3. The content consumption device system of claim 1, wherein the at least one additional Stream is an uncompressed Stream.

4. The content consumption device system of claim 1, wherein the Earcon is associated with an accessibility feature associated with an object in the scene.

5. The content consumption device system of claim 1, further comprising a multiplexer or muxer to merge the Earcon with the at least one Audio signal.

6. The content consumption device system of claim 1, further comprising a multiplexer or muxer to merge the at least one additional Stream with the at least one first Audio Stream.

7. The content consumption device system of claim 1, further comprising: a metadata processor configured to process and/or modify the Earcon metadata so as to cause, at the decision that the Earcon is to be reproduced, the reproduction of the Earcon according to the Earcon metadata.

8. The content consumption device system of claim 7, wherein the metadata processor is configured to control a muxer or multiplexer to merge, based on the Earcon metadata, the at least one additional Stream in which the Earcon is encoded with the at least one first Audio Stream into one Stream.

9. The content consumption device system of claim 7, wherein the metadata processor is configured to perform at least one of the following operations:
embedding metadata in a Stream;
extracting Audio metadata from the least one first Audio Stream;
modifying Earcon metadata to activate the Earcon and/or setting/changing its position; and
modifying Audio metadata of the least one first Audio Stream so as to take into consideration the existence of the Earcon and allow merging.

10. The content consumption device system of claim 7, wherein the metadata processor is a section of the first processor.

11. The content consumption device system of claim 1, configured to generate Earcon metadata at the decision that Earcon is to be reproduced.

12. The content consumption device system of claim 1, further configured to store, for future use, the Earcon metadata.

13. The content consumption device system of claim 1, further configured to store, for future use, the at least one additional Stream.

14. The content consumption device system of claim 1, the Earcon metadata comprising at least one of:
an identification tag,
a type of the Earcon message,
a status,
an indication of dependency/non-dependency from the scene,
positional data,
an indication of the presence of associated text label,
a number of available languages,
a data text length, and
a description of the Earcon.

15. The content consumption device system of claim 1, the Earcon metadata comprising at least one of gain data.

16. The content consumption device system of claim 1, the Earcon metadata comprising at least one of a language of the Earcon.

17. The content consumption device system of claim 1, further configured to perform at least one of the following operations:
receive at least one Audio metadata describing the at least one Audio signal encoded in the at least one first Audio Stream;
synthesize the at least one Earcon associated with the at least one accessibility feature;
generate the Earcon metadata;
generate, based on the Earcon metadata, at least one additional Audio Stream comprising the at least one Earcon and the Earcon metadata; and
multiplex or mux the at least one first Audio Stream and the at least one additional Audio Stream into a single Audio Stream based on the Earcon metadata.

18. The content consumption device system of claim 1, further configured to:
process an Audio Stream comprising the at least one Audio signal encoded and the at least one Earcon uncompressed and the Earcon metadata; and
decode and reproduce the Audio signal and the at least one Earcon Audio signal on the basis of the Earcon metadata.

19. The content consumption device system of claim 1, further configured to:
process an Audio Stream in which the at least one Audio signal is encoded and the at least one additional Stream in which the Earcon is encoded, to acquire one single Audio Stream; and
decode the single Audio Stream and reproduce the Audio signal.

20. The content consumption device system of claim 1, configured to perform a local search for the additional Audio Stream in which the Earcon is encoded and/or Earcon metadata and, in case of non-retrieval, request the additional Audio Stream and/or Earcon metadata to a remote entity.

21. The content consumption device system of claim 1, configured to perform a local search for the at least one additional Audio Stream in which the Earcon is encoded and, in case of non-retrieval, cause the Audio generator to generate the at least one additional Audio Stream in which the Earcon is encoded according to the Earcon metadata.

22. The content consumption device system of claim 1, configured to perform a local search for an Earcon metadata and, in case of non-retrieval generate the Earcon metadata.

23. The content consumption device system of claim 1, further configured to:
generate the at least one additional Audio Stream in which at least one Earcon is encoded; and
decode the at least one additional Audio Stream if the first processor decides that the Earcon is to be reproduced.

24. The content consumption device system of claim 1, wherein the Audio Streams are formatted in the MPEG-H 3D Audio Stream format.

25. The content consumption device system of claim 1, further configured to:
receive data about availability of a plurality of adaptation sets, the available adaptation sets comprising at least one Audio scene adaptation set for the at least one first Audio Stream and at least one Earcon adaptation set for the at least one additional Audio Stream encoding the Earcon;
create, based on the first processor's decision, selection data identifying which of the adaptation sets are to be retrieved, the available adaptation sets comprising at least one Audio scene adaptation set and/or at least one Earcon adaptation set; and request and/or retrieve the data for the adaptation sets identified by the selection data,
wherein each adaptation set groups different encodings for different bitrates.

26. The content consumption device system of claim 1, configured to choose, among a plurality of Earcons to be reproduced, the reproduction of one first Earcon before a second Earcon.

27. The content consumption device system of claim 1, wherein the cache memory stores an Earcon received from a remote entity or generated synthetically, to reuse the Earcon at different instances of time.

28. The content consumption device system of claim 1, configured to check at least one criteria for the reproduction of the Earcon, the criteria comprising the user's selection and/or a user's setting.

29. The content consumption device system of claim 28, configured to check whether the user has deactivated settings of the reproduction of Earcons or system sounds.

30. The content consumption device system of claim 7, wherein the metadata processor is configured to receive an Earcon metadata, to receive, from the first processor, a request to modify the Earcon metadata, and to modify the Earcon metadata to a modified Earcon metadata according to the request from the first processor; and
wherein the first processor is further configured to cause the reproduction of the Earcon according to the modified Earcon metadata.

31. The content consumption device system of claim 7, further configured to receive at least one Video Stream associated with the scene to be reproduced; and
further comprising at least one media Video decoder configured to decode at least one Video signal from the at least one Video Stream for the representation of the scene to the user.

32. The content consumption device system of claim 1, wherein the Earcon is associated with a generic Audio message.

33. A content consumption device system configured to:
receive at least one first Audio Stream associated with a scene to be reproduced,
wherein the content consumption device system comprises:
at least one media Audio decoder configured to decode at least one Audio signal from the at least one first Audio Stream for the representation of the scene to a user;
a metadata processor;
a first processor, configured to:
 receive user's movement data and/or user's selection and/or metadata;
 decide, based at least on the user's movement data and/or metadata and/or user's selection, whether an Earcon is to be reproduced, wherein the Earcon is independent of the at least one Audio signal, wherein the Earcon is associated with Earcon metadata; and
 request, at the first processor's decision that the Earcon is to be reproduced, a modification of the Earcon metadata, to the metadata processor; and
wherein the metadata processor is configured to receive the Earcon metadata, to receive a request to modify the Earcon metadata from the first processor, and to modify the Earcon metadata to a modified Earcon metadata according to the request from the first processor,
wherein the first processor is further configured to cause the reproduction of the Earcon according to the modified Earcon metadata,
wherein the content consumption device system is configured to generate the Earcon metadata; and
wherein the content consumption device system further comprises an Audio generator configured to generate at least one additional Stream in which the Earcon is encoded, based on the Earcon metadata generated by the content consumption device system.

\* \* \* \* \*